(12) United States Patent
Uçar et al.

(10) Patent No.: US 11,513,537 B2
(45) Date of Patent: Nov. 29, 2022

(54) MANAGING DRONES IN VEHICULAR SYSTEM

(71) Applicant: Toyota Motor Engineering & Manufacturing North America, Inc., Plano, TX (US)

(72) Inventors: Seyhan Uçar, Mountain View, CA (US); Baik Hoh, Campbell, CA (US); Kentaro Oguchi, Menlo Park, CA (US)

(73) Assignee: TOYOTA MOTOR ENG & MFG NORTH AMERICA, INC., Plano, TX (US)

(*) Notice: Subject to any disclaimer, the term of this patent is extended or adjusted under 35 U.S.C. 154(b) by 366 days.

(21) Appl. No.: 16/408,349

(22) Filed: May 9, 2019

(65) Prior Publication Data

US 2020/0356114 A1 Nov. 12, 2020

(51) Int. Cl.
 *G05D 1/10* (2006.01)
 *B64C 39/02* (2006.01)
 (Continued)

(52) U.S. Cl.
 CPC .......... *G05D 1/104* (2013.01); *B64C 39/024* (2013.01); *G05D 1/12* (2013.01);
 (Continued)

(58) Field of Classification Search
 CPC ....... B60W 60/00256; B64C 2201/205; B64C 2201/206; B64C 2201/208; B64C 2201/00; B64C 2201/024; B64C 2201/027; B64C 2201/06; B64C 2201/063; B64C 2201/066; B64C 2201/141; B64C 2201/143; B64C 2201/145; B64C 2201/146; B64C 2201/20; B64C 2201/128; G05D 1/104; G05D 1/12; G06Q 10/08355
 See application file for complete search history.

(56) References Cited

U.S. PATENT DOCUMENTS 9,387,928 B1 * 7/2016 Gentry .................... B60L 53/00
9,454,157 B1 * 9/2016 Hafeez ................. G08G 5/0056
(Continued)

FOREIGN PATENT DOCUMENTS

WO 2018/065977 4/2018

OTHER PUBLICATIONS

Ghazzai et al., "On the Placement of UAV Docking Stations for Future Intelligent Transportation Systems," 2017 IEEE 8th Vehicular Technology Conference (VTC Spring), Jun. 4-7, 2017, 6 pgs.

*Primary Examiner* — Russell Frejd
*Assistant Examiner* — Sara J Lewandroski
(74) *Attorney, Agent, or Firm* — VLP Law Group LLP; Michel Bohn

(57) ABSTRACT

In an example, a method may assign a first drone of a drone network a first task, the first task may instruct the first drone to transport a first package to a first destination in a geographic area. The method may receive roadway traffic data for a plurality of roadway vehicles in the geographic area; determine, based on the roadway traffic data and during transit of the first package to the first destination by the first drone, to transfer the first package to a second drone in the drone network; and transfer the first package to the second drone in the drone network.

18 Claims, 11 Drawing Sheets

(51) Int. Cl.
  *G05D 1/12* (2006.01)
  *G08G 1/01* (2006.01)
  *G06Q 10/08* (2012.01)

(52) U.S. Cl.
  CPC ....... *G06Q 10/08355* (2013.01); *G08G 1/012* (2013.01); *G08G 1/0125* (2013.01); *B64C 2201/027* (2013.01); *B64C 2201/128* (2013.01); *B64C 2201/143* (2013.01)

(56) References Cited

U.S. PATENT DOCUMENTS

| | | | | |
|---|---|---|---|---|
| 9,659,502 | B1* | 5/2017 | Abebe | G08G 1/20 |
| 9,792,576 | B1* | 10/2017 | Jamjoom | B64C 39/024 |
| 10,032,125 | B1* | 7/2018 | Berg | G06Q 30/0265 |
| 10,454,564 | B2* | 10/2019 | Sham | H04B 7/185 |
| 10,789,567 | B1* | 9/2020 | Ur | G06Q 10/08355 |
| 2005/0222763 | A1* | 10/2005 | Uyeki | G01C 21/3492 340/995.13 |
| 2015/0370251 | A1* | 12/2015 | Siegel | B64C 39/024 701/2 |
| 2016/0196756 | A1* | 7/2016 | Prakash | G08G 5/025 701/3 |
| 2016/0257401 | A1* | 9/2016 | Buchmueller | G06Q 50/28 |
| 2017/0069214 | A1* | 3/2017 | Dupray | G08G 5/0013 |
| 2017/0139424 | A1* | 5/2017 | Li | G08G 5/0013 |
| 2018/0090014 | A1* | 3/2018 | Kline | G05D 1/104 |
| 2018/0165973 | A1* | 6/2018 | Chun | G05D 1/0005 |
| 2018/0364713 | A1* | 12/2018 | Foster, II | G08G 5/0043 |
| 2019/0034877 | A1* | 1/2019 | Cantrell | G05D 1/0291 |
| 2019/0039731 | A1* | 2/2019 | Marcath | B64F 1/10 |
| 2019/0043000 | A1* | 2/2019 | Wang | B60L 53/30 |
| 2019/0043370 | A1* | 2/2019 | Mulhall | G01C 21/20 |
| 2019/0100307 | A1* | 4/2019 | Beltman | G05D 1/104 |
| 2019/0108472 | A1* | 4/2019 | Sweeney | G06Q 10/083 |
| 2019/0180237 | A1* | 6/2019 | Mattingly | H04L 9/50 |
| 2019/0199534 | A1* | 6/2019 | Beaman | H04L 9/3239 |
| 2019/0220819 | A1* | 7/2019 | Banvait | G01C 21/3453 |
| 2019/0233102 | A1* | 8/2019 | Kaneichi | G08G 5/0069 |
| 2019/0236963 | A1* | 8/2019 | High | G08G 5/0021 |
| 2019/0259120 | A1* | 8/2019 | Mattingly | G07C 5/008 |
| 2019/0295033 | A1* | 9/2019 | Longin | G08G 5/0034 |
| 2019/0391599 | A1* | 12/2019 | Nutzati Fontaine | G06Q 50/30 |
| 2020/0019925 | A1* | 1/2020 | Tokhtabaev | B64D 9/00 |
| 2020/0191581 | A1* | 6/2020 | Chun | G01C 21/3407 |
| 2020/0242948 | A1* | 7/2020 | Zeng | G08G 5/0043 |
| 2021/0142679 | A1* | 5/2021 | Inotsume | G08G 5/0039 |

* cited by examiner

MANAGING DRONES IN VEHICULAR SYSTEM

BACKGROUND

The present disclosure relates to drone management. In a more particular example, the disclosure relates to technologies for managing drones in a vehicular system.

Drones are popularly used in a wide variety of areas for data collection, telecommunication, package delivery, security, and surveillance, etc. However, the drones often have limited operation range because they can only travel a limited distance due to their limited power source. Today, some modern systems rely on optimal placement of charging stations to extend the operation range of the drones. However, these existing solutions are usually inflexible and inefficient because the drones may fly to and from various locations and the charging stations may not exist in their travel routes. Other existing systems generally select a vehicle to carry the drone closer to the destination associated with the assigned task of the drone. However, there may not be a vehicle that can carry the drone towards the destination among the vehicles available on the roads. Even if there is a vehicle that can carry the drone to a point closer to the destination, the distance between that point and the destination may still be longer than the distance that the drone can fly, given its remaining power source. Therefore, it is generally impractical or impossible for these existing systems to guarantee that the assigned task of the drone is successfully completed.

SUMMARY

The subject matter described in this disclosure overcomes the deficiencies and limitations of the existing solutions by providing novel technology for managing drones in a vehicular system.

According to one innovative aspect of the subject matter described in this disclosure, a computer-implemented method comprises: assigning a first drone of a drone network a first task, the first task instructing the first drone to transport a first package to a first destination in a geographic area; receiving roadway traffic data for a plurality of roadway vehicles in the geographic area; determining, based on the roadway traffic data and during transit of the first package to the first destination by the first drone, to transfer the first package to a second drone in the drone network; and transferring the first package to the second drone in the drone network.

In general, another innovative aspect of the subject matter described in this disclosure may be embodied in computer-implemented methods comprising: receiving, at a first drone of a drone network, a first task to transport a first package to a first destination in a geographic area; receiving roadway traffic data for the geographic area; determining, based on the roadway traffic data and during transit of the first package to the first destination by the first drone, to transfer the first package to a second drone of the drone network; wirelessly communicating a request to transfer the first package to the second drone; wirelessly receiving a response to the request accepting the transfer of the first package; and transferring the first package to the second drone.

In general, another innovative aspect of the subject matter described in this disclosure may be embodied in systems comprising: one or more processors; and one or more memories storing instructions that, when executed by the one or more processors, cause the system to: assign a first drone of a drone network a first task, the first task instructing the first drone to transport a first package to a first destination in a geographic area; receive roadway traffic data for a plurality of roadway vehicles in the geographic area; determine, based on the roadway traffic data and during transit of the first package to the first destination by the first drone, to transfer the first package to a second drone in the drone network; and transfer the first package to the second drone in the drone network.

These and other implementations may each optionally include one or more of the following features: that determining a vehicle route of a first roadway vehicle based on the roadway traffic data, wherein the first drone is docked on the first roadway vehicle that is traveling towards the first destination in the geographic area, and determining to transfer the first package to the second drone is based on a range of the first drone and the vehicle route of the first roadway vehicle; that determining to transfer the first package to the second drone includes determining, based on the range of the first drone and the vehicle route of the first roadway vehicle, that the first destination is unreachable by the first drone, determining, based on a proximate traffic condition, that a traffic flow of one or more roadway vehicles is insufficient for transporting the first drone to within a drop-off region of the first destination, and determining to transfer the first package to the second drone based on the first destination being unreachable and the traffic flow being insufficient; that the second drone is docked on a second roadway vehicle that is traveling towards the first destination in the geographic area, determining to transfer the first package to the second drone includes determining a vehicle route of the second roadway vehicle based on the roadway traffic data, selecting, from the drone network, the second drone based on the vehicle route of the second roadway vehicle, and transferring the first package to the second drone includes reassigning the first task to the second drone, the reassigned first task instructing the second drone to transport the first package to the first destination in the geographic area, and coordinating a package handover of the first package from the first drone to the second drone; that selecting the second drone includes determining, based on an assigned task of the second drone, an available range of the second drone, determining, based on the available range of the second drone and the vehicle route of the second roadway vehicle, that the first destination will be reachable by the second drone, and selecting the second drone from the drone network based on the first destination being reachable by the second drone; that selecting the second drone includes determining, based on a proximate traffic condition, that a traffic flow of one or more roadway vehicles is sufficient for transporting the second drone to within a drop-off region of the first destination, and selecting the second drone from the drone network based on the traffic flow being sufficient; that assigning the second drone of the drone network a second task, the second task instructing the second drone to transport a second package to a second destination in the geographic area, reassigning the first task to the second drone and the second task to the first drone, transferring the first package from the first drone to a first roadway vehicle, transferring the second package from the second drone to a second roadway vehicle, navigating the first drone from the first roadway vehicle to the second roadway vehicle having the second package, and navigating the second drone from the second roadway vehicle to the first roadway vehicle having the first package, wherein transferring the first package to the second drone includes transferring the first package from the first drone to the first roadway vehicle, and transferring the first package from the first roadway vehicle to the second drone; that reassigning the first task to the second drone and the second task to the first drone is based on one or more of a task priority, a battery level of the first drone, a battery level of the second drone, a traffic condition associated with a vehicle route of the first roadway vehicle, and a traffic condition associated with a vehicle route of the second roadway vehicle.

These and other implementations may each optionally include one or more of the following features: that the second drone is docked on a second roadway vehicle that is traveling towards the first destination in the geographic area, wirelessly communicating the request to transfer the first package to the second drone includes reassigning the first task to the second drone, the reassigned first task instructing the second drone to transport the first package to the first destination in the geographic area, and transferring the first package to the second drone includes navigating to the second roadway vehicle, and performing a package handover of the first package from the first drone to the second drone; that the second drone is assigned a second task, the second task instructing the second drone to transport a second package to a second destination in the geographic area, wirelessly communicating the request to transfer the first package to the second drone includes reassigning the first task to the second drone and the second task to the first drone, and transferring the first package to the second drone includes transferring the first package from the first drone to a first roadway vehicle, navigating from the first roadway vehicle to a second roadway vehicle having the second package, the second package being transferred from the second drone to the second roadway vehicle, and transferring the second package from the second roadway vehicle to the first drone; that selecting the second drone from the drone network based on one or more of a range of the first drone, a range of the second drone, a traffic condition associated with a vehicle route of a first roadway vehicle, the first drone is docked on the first roadway vehicle, a traffic condition associated with a vehicle route of a second roadway vehicle, and that the second drone is docked on the second roadway vehicle.

Other implementations of one or more of these and other aspects include corresponding systems, apparatus, and computer programs, configured to perform the actions of methods, encoded on non-transitory computer storage devices.

The novel technology for managing drones in a vehicular system presented in this disclosure is particularly advantageous in a number of respects. For example, the technology described herein is capable of enabling the drones to collaboratively form a drone network, in which the first drone can hand over or switch its drone task with a second drone of the drone network based on the roadway traffic data (e.g., roadway data of road segments, vehicle data of roadway vehicles, etc.) and/or other factors (e.g., range of the drones, destination point, subsequent stop point of the drones, urgency level of drone task, etc.). For example, in the package delivery system, if the first drone is incapable of reaching a first destination to deliver a first package due to its limited flight range, the first drone may hand over the first package to the second drone docked on the second roadway vehicle, and the second drone may transport the first package of the first drone in addition to its own package. In another example, the first drone docked on the first roadway vehicle and the second drone docked on the second roadway vehicle may release their packages and switch to dock on the other roadway vehicle that previously transported the other drone, thereby exchanging their drone tasks with one another. Due to the collaboration among the drones in the drone network, the present technology can significantly improve the likelihood that the drone tasks are successfully completed.

Furthermore, the technology described herein can take advantage of the roadway vehicles present on the roads to transport the drones. As a result, the present technology can maximize the overall utilization of these roadway vehicles and eliminate the need to introduce more roadway vehicles on the roads, thereby avoid intensifying vehicular emission and traffic congestion. In addition, the technology described herein can use the drones with limited operation range to perform the drone tasks without increasing the potential risk of task failure, and thus the security concern can be addressed. The present technology is advantageously applicable in various systems that utilize the drones to deliver packages, detect traffic accidents, surveil crime scenes, facilitate transportation with the drones being implemented as mobile roadside units, etc. It should be understood that the foregoing advantages are provided by way of example and that the technology may have numerous other advantages and benefits.

The disclosure is illustrated by way of example, and not by way of limitation in the figures of the accompanying drawings in which like reference numerals are used to refer to similar elements.

DESCRIPTION

Figure 1A:
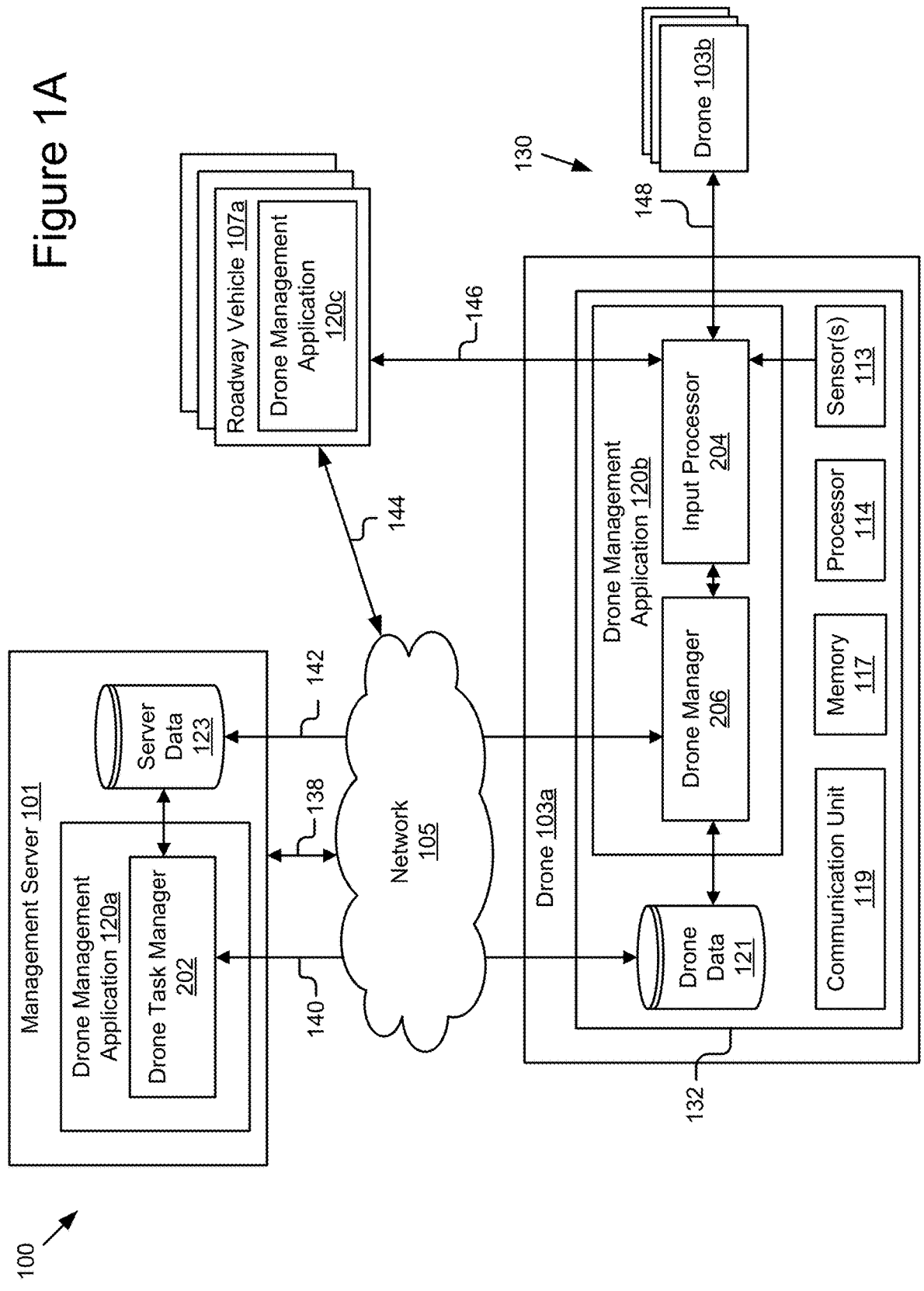
FIG. 1A is a block diagram of an example system for managing drones.

The technology described herein can advantageously manage the drones of the drone network to significantly improve the likelihood that drone task is successfully completed. As described in further detail below, the technology includes various aspects, such as drone management methods, systems, computing devices, computer program products, and apparatuses, among other aspects.

Drones are popularly used in various areas. However, it is challenging to expand the drone service area in which the drones are used to perform tasks and guarantee that the tasks are successfully completed due to the limited battery capacity of the drones, excessive cost of the drones that can fly long distances, drone restricted zone, etc. The present technology can leverage the drone collaboration to significantly improve the likelihood that the drone tasks are successfully completed. As discussed in details below, multiple short-range and low-cost drones may form a drone network, the drones of the drone network may include free drones that are flying on their own and/or hosted drones that are piggy-backing on host roadway vehicles. The drones in the drone network that are located proximate to one another may dynamically switch or reassign their drone tasks based on various static, dynamic, and/or predefined factors (e.g., real-time traffic information, predicted traffic information, start point and destination point of the drones, package destination, subsequent stop point of the drones, remaining battery of the drones, etc.), thereby improving the likelihood of completion of the drone tasks.

For example, in the context of package delivery, the present technology enables not only the switching of drones among host roadway vehicles but also enables the switching of packages among drones. During the transit of packages by the drones, the drones may receive sensor data from their drone sensors, drone data from other drones, up-to-date roadway traffic information from connected roadway vehicles, roadway infrastructures (e.g., roadside units, edge servers, etc.), and/or other drones, etc. The drones may establish a drone network with other proximate drones, and use the roadway traffic information (e.g., roadway conditions, traffic flow, vehicle data, etc.) to determine their route plan, switch among host roadway vehicles (e.g., the first drone may carry the package and switch to situate on another roadway vehicle), collaboratively switch packages among the drones in the drone network (e.g., the first drone and the second drone may release their packages onto the roadway vehicles that they are currently docked and switch to the roadway vehicle that previously carried the other drone, the first drone may delegate its drone task to the second drone, etc.). The present technology also enables the collaboration between the roadway vehicles and the drones to facilitate the drone operation of the drones. For example, the roadway vehicles may provide updates on their vehicle trajectory, include one or more vehicle stops on their vehicle route, slow down as the drones perform the drone switching or package switching, etc.

The present technology enables a vehicular system in which the drone operations of the drones are independent from the host roadway vehicles on which the drones may dock and independent from the packages that the drones may carry. As a result, the drones may flexibly switch the roadway vehicle on which the drones are piggybacking and switch their packages as needed so that the packages can be successfully transported to the corresponding destinations. The present technology is applicable to the Drone-as-a-Service (DaaS) model.

An example drone management system may assign a first task to a first drone and the first task may instruct the first drone to transport a first package to a first destination in a geographic area. The drone management system may receive roadway traffic data for a plurality of roadway vehicles in the geographic area. During the transit of the first package to the first destination by the first drone, the drone management system may determine to transfer the first package to a second drone in the drone network based on the roadway traffic data, and the first drone may then transfer the first package to the second drone in the drone network.

As an example of the package transfer, the first drone may perform a package handover of the first package to the second drone, and thus the first package may then be transported by the second drone situated on a second road-way vehicle. As another example, the first drone and the second drone may perform a task exchange. To perform the task exchange between the first drone docked on the first roadway vehicle and the second drone docked on the second roadway vehicle, the first drone may release the first package onto the first roadway vehicle, and the second drone may release the second package onto the second roadway vehicle. The first drone may navigate to the second roadway vehicle having the second package, and receive the second package released by the second drone. The second drone may navigate to the first roadway vehicle having the first package, and receive the first package released by the first drone. Thus, the first package may then be transported by the second drone situated on the first roadway vehicle, and the second package may then be transported by the first drone situated on the second roadway vehicle. It should be understood that while the drone management system is described herein in the context of package delivery, the drone management system is applicable to any context in which the drones are implemented.

FIG. 1A is a block diagram of an example system 100 for managing drones in a vehicular system. As shown, the system 100 includes a management server 101, one or more drones 103a . . . 103n, and one or more roadway vehicles 107a . . . 107n coupled for electronic communication via a network 105. The one or more drones 103a . . . 103n may be coupled to one another via signal lines 148 (e.g., drone-to-drone connection) to form a drone network 130. In FIG. 1A and the remaining figures, a letter after a reference number, e.g., "103a", represents a reference to the element having that particular reference number. A reference number in the text without a following letter, e.g., "103", represents a general reference to instances of the element bearing that reference number. It should be understood that the system 100 depicted in FIG. 1A is provided by way of example and the system 100 and/or further systems contemplated by this present disclosure may include additional and/or fewer components, may combine components and/or divide one or more of the components into additional components, etc. For example, the system 100 may include any number of drones 103, roadway vehicles 107, management servers 101, or networks 105.

The network 105 may be a conventional type, wired and/or wireless, and may have numerous different configurations including a star configuration, token ring configuration, or other configurations. For example, the network 105 may include one or more local area networks (LAN), wide area networks (WAN) (e.g., the Internet), personal area networks (PAN), public networks, private networks, virtual networks, peer-to-peer networks, near-field networks (e.g., Bluetooth®, NFC, etc.), vehicular networks, drone networks, and/or other interconnected data paths across which multiple devices may communicate.

The network 105 may also be coupled to or include portions of a telecommunications network for sending data in a variety of different communication protocols. Example protocols include, but are not limited to, transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOW), file transfer protocol (FTP), WebSocket (WS), wireless access protocol (WAP), various messaging protocols (SMS, MMS, XMS, IMAP, SMTP, POP, WebDAV, etc.), or other suitable protocols. In some embodiments, the network 105 is a wireless network using a connection such as Dedicated Short Range Communication (DSRC), WAVE, 802.11p, a 3G, 4G, 5G+ network, WiFi™, satellite networks, vehicle-to-vehicle (V2V) networks, vehicle-to-infrastructure/infrastructure-to-vehicle (V2I/I2V) networks, drone-to-drone networks, drone-to-infrastructure/infrastructure-to-everything (D2I/D2N) networks, or any other wireless networks. Although FIG. 1A illustrates a single block for the network 105 that couples to the management server 101, the drone(s) 103, and the roadway vehicle(s) 107, it should be understood that the network 105 may in practice comprise any number of combination of networks, as noted above.

The roadway vehicle 107 may be a vehicle platform that includes a processor, a memory, and network communication capabilities (e.g., a communication unit). The roadway vehicle 107 may be configured to transmit data to and/or receive data from the management server 101, other roadway vehicles 107, and/or the drones 103 via the network 105. In some embodiments, as the roadway vehicle 107 is located within the communication range of the drone 103, the roadway vehicle 107 may be communicatively coupled to the drone 103 via signal line 146 (e.g., drone-to-vehicle connection). In some embodiments, the roadway vehicle 107(s) are capable of transporting on a roadway surface (e.g., ground surface, water surface, etc.). Non-limiting examples of the roadway vehicle 107(s) include a vehicle, an automobile, a bus, a boat, a bionic implant, a robot, or any other roadway vehicle platforms. In some embodiments, the roadway vehicle 107 may carry one or more drones 103 as the roadway vehicle 107 travels on the roadway surface. The drone 103 may dock on the roadway vehicle 107 (e.g., situated on the vehicle roof), and thus proceed together with the roadway vehicle 107. As a result, the roadway vehicle 107 may transport the drone 103 from one point to another as the roadway vehicle 107 travels along the roads without the drone 103 flying on its own and consuming its drone power source. In some embodiments, the roadway vehicle 107 may cooperate with the drone 103 to facilitate the drone operations of the drone 103. For example, the roadway vehicle 107 may decrease the vehicle speed as the drone 103 prepares to land on or take off the vehicle roof of the roadway vehicle 107, thereby facilitating the docking and undocking of drone 103 on the roadway vehicle 107.

The drone(s) 103 include computing device(s) 132 having sensor(s) 113, processor(s) 115, memory(ies) 117, communication unit(s) 119, a drone data store 121, and a drone management application 120. Examples of computing device 132 of the drone 103 may include virtual or physical computer processors, control units, micro-controllers, etc., which are coupled to other components of the drone 103, such as one or more sensors 113, one or more actuators, one or more motivators, etc. The drone 103 may be coupled to the network 105 and may send and receive data to and from the management server 101 via the network 105 as indicated by the signal lines 140 and 142. The drone 103 may also be communicatively coupled to the roadway vehicle(s) 107 via the network 105 and/or the signal line 146, and communicatively coupled to other drone(s) 103 via the network 105 and/or the signal line 148, etc. In some embodiments, the drones 103 that are located within a predefined distance (e.g., 300 m) from a reference point (e.g., a traffic intersection, a drone location of a first drone 103) may couple to one another to establish a drone network. In some embodiments, the drone 103 may be an aerial vehicle platform capable of flying from one point to another. Non-limiting examples of the drone 103 include, but are not limited to, an unmanned drone controlled by an onboard computing device, unmanned drone remotely controlled by a human operator and/or control system, aircraft controlled by an onboard human pilot, etc.

Figure 1B:
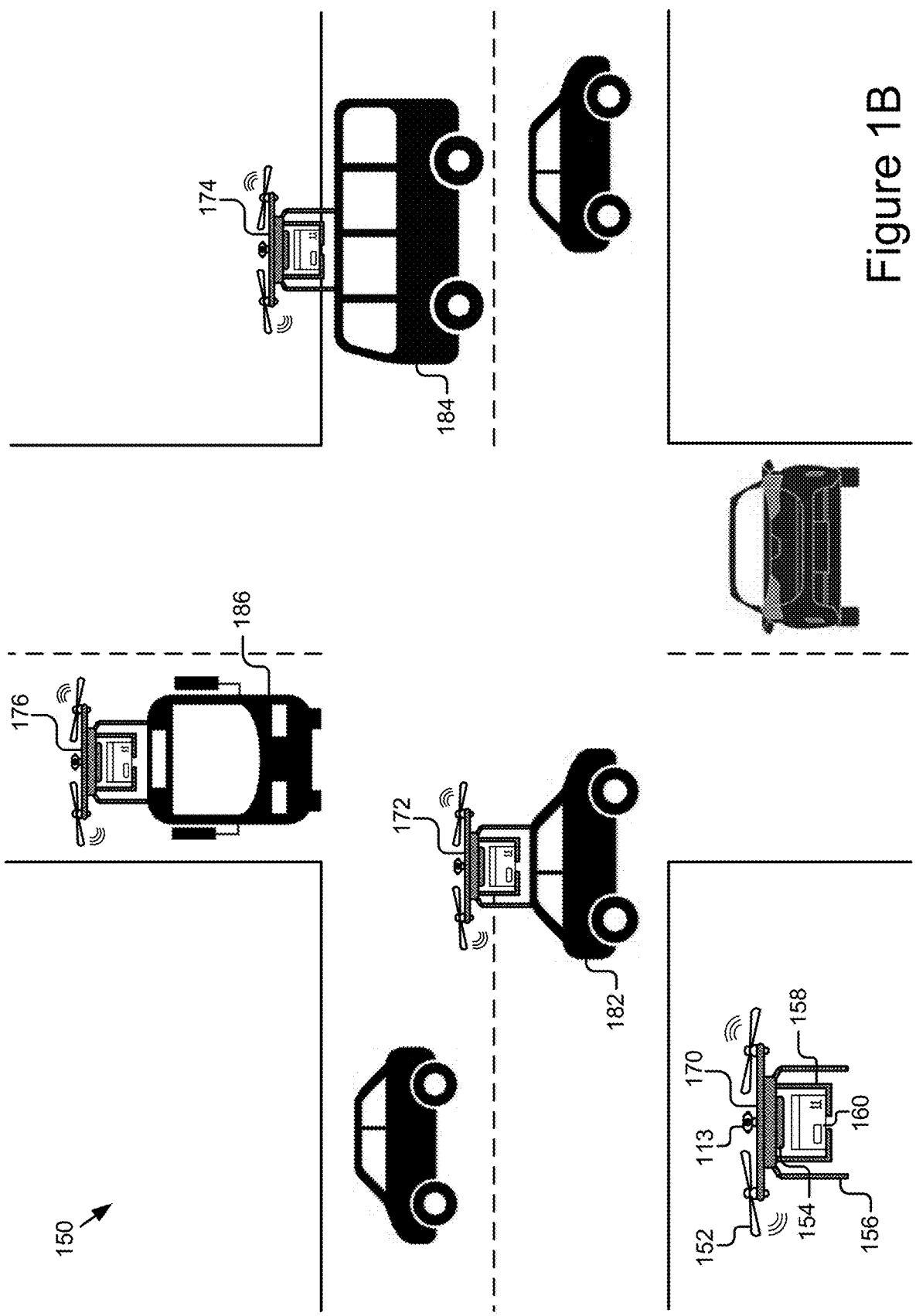
FIG. 1B illustrates an example geographic area including multiple drones and multiple roadway vehicles.

An example of the drone 103 is illustrated in FIG. 1B. FIG. 1B depicts an example geographic area 150 including multiple drones 103 and multiple roadway vehicles 107. Each drone 103 may dock on a roadway vehicle 107 to be transported by the roadway vehicle 107 or may fly on its own. For example, as depicted in FIG. 1B, the drones 172, 174, 176 may be respectively situated on the roadway vehicles 182, 184, 186, while the drone 170 may fly independently. As illustrated, each drone 103 may wirelessly send and receive data to and from other entities (e.g., other drones 103, the roadway vehicles 107, the management server 101, etc.). In some embodiments, the drone 103 is capable of carrying and transporting objects. As depicted in FIG. 1B, to provide the capabilities of flying and transporting objects, the drone 103 may include the sensor(s) 113, the propeller(s) 152, the power source 154 (e.g., drone battery), the landing gear 156, the package handler 158, etc. In some embodiments, the package handler 158 may include one or more mechanical arms, mechanical claws, and/or other mechanical structures to grasp and release the package 160 transported by the drone 103. The package handler 158 may also accommodate and/or provide support to the package 160 during transportation. Other components of the drone 103 are also possible and contemplated.

The processor 115 may execute software instructions (e.g., tasks) by performing various input/output, logical, and/or mathematical operations. The processor 115 may have various computing architectures to process data signals. The processor 115 may be physical and/or virtual, and may include a single core or plurality of processing units and/or cores. The processor 115 may receive and store the sensor data as drone operation data in the drone data store 121 for access and/or retrieval by the drone management application 120 and/or other drone applications. In some implementations, the processor 115 may be capable of controlling various actuators, motivators, and/or other components of the drone 103 (e.g., propellers, motors, landing gear, etc.). The processor 115 may also be capable of performing complex tasks including various types of data processing and drone management, etc. In some implementations, the processor 115 may be coupled to the memory 117 via bus (not shown) to access data and instructions therefrom and store data therein. The bus may couple the processor 115 to the other components of the drone 103 including, for example, the sensor 113, the memory 117, the communication unit 119, and/or the drone data store 121.

Figure 2:
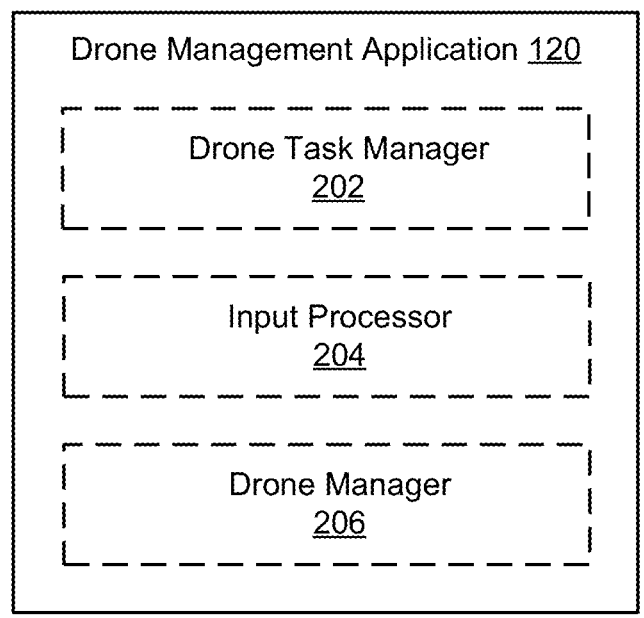
FIG. 2 is a block diagram of an example drone management application.

The drone management application 120 includes software and/or hardware logic executable to manage the drones to improve the likelihood that drone task is successfully completed. As illustrated in FIG. 1A, the management server 101, the drones 103, and the roadway vehicles 107 may include instances 120a, 120b, and 120c of the drone management application 120. In some embodiments, each instance 120a, 120b, 120c may comprise one or more components as depicted in FIG. 2, and may be configured to fully or partially perform the functionalities described herein depending on where the instance resides. In some embodiments, the drone management application 120 may be implemented using software executable by one or more processors of one or more computer devices, using hardware, such as but not limited to a field-programmable gate array (FPGA), an application-specific integrated circuit (ASIC), etc., and/or a combination of hardware and software, etc. The drone management application 120 may receive and process the drone data and/or the roadway traffic data, and communicate with other components of the drone 103 via the bus, such as the communication unit 119, the memory 117, the drone data store 121, etc. The drone management application 120 is described in details below with reference to at least FIGS. 2-8B.

The memory 117 includes a non-transitory computer-usable (e.g., readable, writeable, etc.) medium, which can be any tangible non-transitory apparatus or device that can contain, store, communicate, propagate or transport instructions, data, computer programs, software, code, routines, etc., for processing by or in connection with the processor 115. For example, the memory 117 may store the drone management application 120 and/or other drone applications. In some implementations, the memory 117 may include one or more of volatile memory and non-volatile memory. For example, the memory 117 may include, but is not limited to, one or more of a dynamic random access memory (DRAM) device, a static random access memory (SRAM) device, a discrete memory device (e.g., a PROM, FPROM, ROM), a hard disk drive, an optical disk drive (CD, DVD, Blue-Ray™, etc.). It should be understood that the memory 117 may be a single device or may include multiple types of devices and configurations.

The communication unit 119 transmits data to and receives data from other computing devices to which it is communicatively coupled (e.g., via the network 105, drone-to-drone connections 148, drone-to-vehicle connections 146, etc.) using wireless and/or wired connections. The communication unit 119 may include one or more wired interfaces and/or wireless transceivers for sending and receiving data. The communication unit 119 may couple to the network 105 and communicate with other entities of the system 100, such as other drone(s) 103, roadway vehicle(s) 107, and/or management server 101, etc. The communication unit 119 may exchange data with other computing nodes using standard communication methods, such as those discussed above.

The sensor(s) 113 includes any type of sensors suitable for the drone(s) 103. The sensor(s) 113 may be configured to collect any type of signal data suitable to determine characteristics of the drone 103 and/or its internal and external environments. Non-limiting examples of the sensor(s) 113 include various optical sensors and/or image sensors (CCD, CMOS, 2D, 3D cameras, etc.), motion detection sensors, barometers, altimeters, thermocouples, moisture sensors, switches, infrared (IR) sensors, radar sensors, other photosensors, gyroscopes, accelerometers, speedometers, steering sensors, geo-location sensors (Global Positioning System (GPS) sensor), orientation sensor, wireless transceivers (e.g., cellular, WiFi™, near-field, etc.), sonar sensors, ultrasonic sensors, proximity sensors, distance sensors, tilt sensor, magnetic sensor, current sensor, engine intake flow sensor, inertial measurement unit, etc. In some embodiments, the sensors 113 may be provided at the top side, bottom side, right side, and/or left side of the drone 103 in order to capture the situational context surrounding the drone 103.

The drone data store 121 includes a non-transitory storage medium that stores various types of data. For example, the drone data store 121 of a first drone 103 may store drone data of the first drone 103. In some embodiments, the drone data may include drone operation data collected from multiple sensors 113 coupled to different components of the first drone 103 for monitoring operating states of these components. Non-limiting examples of the drone operation data include the drone location (e.g., GPS coordinates), the moving direction, the drone speed (e.g., 25 mph), the drone acceleration/deceleration rate, the drone altitude (e.g., 14 m), the tilt angle (e.g., (15°), the propeller speed (Revolutions Per Minute—RPM), the motor temperature, etc. In some embodiments, the drone operation data may include the energy level indicating the remaining power source of the first drone 103 (e.g., 50%). The energy level of the first drone 103 may also be referred to herein as the battery level. In some embodiments, the drone operation data may include the range of the first drone 103 indicating the flight distance that the first drone 103 can fly given its energy level and/or operation constraints (e.g., flight endurance limit, motor temperature threshold, etc.). The range of the first drone 103 may dynamically change over time as the first drone 103 performs various operations and consume its drone power source. The range of the first drone 103 may also be referred to herein as the current range of first drone 103 or the flight range of first drone 103. Other types of drone operation data are also possible and contemplated.

In some embodiments, the drone data may include a drone task list describing multiple drone tasks assigned to the first drone 103, the drone task may be referred to herein as a task. In the context of package delivery, the drone task may instruct the first drone 103 to transport a first package to a destination. For the drone task associated with the first package, the drone task list may include a task identifier (ID) uniquely identifying the drone task, the pick-up point at which the first package is picked up, the destination point to which the first package is transported, the package data describing the first package (e.g., package weight, package urgency level, etc.), etc. In some embodiments, the drone data may also specify the current drone task currently performed by the first drone 103, and the subsequent stop point of the first drone 103 to which the first drone 103 may navigate subsequent to performing the current drone task. In some embodiments, the drone data may also specify the roadway vehicle 107 on which the first drone 103 is currently docked. Other types of drone data are also possible and contemplated.

In some embodiments, the drone data store 121 of the first drone 103 may store drone data associated with other drones 103. The drone data associated with a second drone 103 being stored in the drone data store 121 may include the drone location of the second drone 103, the flight range of the second drone 103, the task ID of the current drone task performed by the second drone 103, the package data of a second package that is associated with the current drone task of the second drone 103, the destination point to which the second package is transported, the subsequent stop point of the second drone 103, the roadway vehicle 107 on which the second drone 103 is currently docked, etc.

In some embodiments, the drone data store 121 of the first drone 103 may store roadway traffic data describing one or more road segments in the geographic area and one or more roadway vehicles 107 in the geographic area. In some embodiments, the roadway traffic data may include roadway data associated with one or more road segments. The roadway data associated with a road segment may include the roadway status of the road segment (e.g., lane closure, road construction, detour), the drone restriction status of the road segment (e.g., fly zone, no-fly zone), the historical traffic data describing traffic pattern of the road segment (e.g., roadway vehicles 107 in the middle lane usually move to the right lane to enter the freeway), the traffic metrics describing the traffic condition of the road segment, etc. In some embodiments, the traffic metrics describing the traffic condition of the road segment may include the vehicle density indicating the number of roadway vehicles present on a predefined distance of the road segment (e.g., 40 vehicles/km), the traffic flow rate indicating the number of vehicles passing a static point on the road segment in a predefined time period (e.g., 4000 vehicles/h), the vehicle speed indicating the average speed of the roadway vehicles traveling on the road segment (e.g., 40 mph), the following distance indicating the average distance between the roadway vehicles traveling on the road segment (e.g., 5 m), etc. Other types of roadway data are also possible and contemplated.

In some embodiments, the roadway traffic data may include vehicle data associated with one or more roadway vehicles 107 in the geographic area. Non-limiting examples of the vehicle data associated with a roadway vehicle 107 include the vehicle speed, the vehicle acceleration/deceleration rate, the vehicle start point, the vehicle destination point, the vehicle route currently followed by the roadway vehicle 107, the vehicle location indicating the geographic location of the roadway vehicle 107 (e.g., GPS coordinates), the vehicle lane indicating the lane in which the roadway vehicle 107 proceeds, etc. In some embodiments, the vehicle data associated with the roadway vehicle 107 may also include the vehicle attributes of the roadway vehicle 107 (e.g., private vehicle, public vehicle, fixed routes and schedules, etc.), the vehicle behavior data describing the vehicle maneuvers performed by the roadway vehicle 107 during a recent time window (e.g., in the last 10 minutes), the historical travel data describing travel pattern of the roadway vehicle 107 (e.g., the roadway vehicle 107 usually takes exit 293 on freeway 1-15 on Saturday afternoon), etc. Other types of vehicle data are also possible and contemplated.

In some embodiments, the drone data store 121 may be part of a data storage system (e.g., a standard data or database management system) for storing and providing access to data. Other types of data stored in the drone data store 121 are also possible and contemplated.

The management server 101 may be a hardware and/or virtual server that includes a processor, a memory, and network communication capabilities (e.g., a communication unit). The management server 101 may be communicatively coupled to the network 105, as reflected by signal line 138. In some embodiments, the management server 101 may send and receive data to and from other entities of the system 100 (e.g., the drones 103 and/or the roadway vehicles 107) via the network 105. As depicted, the management server 101 may include an instance 120a of the drone management application 120, and a server data store 123 that stores various types of data for access and/or retrieval by this application.

In some embodiments, the server data store 123 includes a non-transitory storage medium that stores drone data of multiple drones 103 in the geographic area. As discussed elsewhere herein, the drone data of a first drone 103 may include the drone location, the battery level (e.g., 87%), the current range of the first drone 103 (e.g., 150 m), the drone task list of the first drone 103, the current drone task being performed by the first drone 103, a priority of the task, the package data of the first package associated with the current drone task, the destination point to which the first package is transported, the subsequent stop point of the first drone 103, the roadway vehicle 107 on which the first drone 103 is currently docked, etc. It should be understood that the server data store 123 may also store other types of drone data of the first drone 103.

In some embodiments, the server data store 123 may store roadway traffic data describing one or more road segments in the geographic area and one or more roadway vehicles 107 in the geographic area. As discussed elsewhere herein, the roadway traffic data may include the roadway data associated with one or more road segments. The roadway data associated with a road segment may include the roadway status, the drone restriction status, the historical traffic data, the traffic metrics describing the traffic condition of the road segment (e.g., the vehicle density, the traffic flow rate, the average vehicle speed, the average following distance, etc.), etc. As discussed elsewhere herein, the roadway traffic data may also include the vehicle data associated with one or more roadway vehicles 107. The vehicle data associated with a roadway vehicle 107 may include the vehicle speed, the vehicle acceleration/deceleration rate, the vehicle start point, the vehicle destination point, the vehicle location, the vehicle lane, the vehicle route, the historical travel data, the vehicle attributes (e.g., public vehicle, private vehicle, fixed routes and schedules, etc.), etc., of the roadway vehicle 107. It should be understood that the server data store 123 may also store other types of roadway traffic data.

In some embodiments, the server data store 123 may be part of a data storage system (e.g., a standard data or database management system) for storing and providing access to data. Other types of data stored in the server data store 123 are also possible and contemplated.

Other variations and/or combinations are also possible and contemplated. It should be understood that the system 100 in FIG. 1A is merely an example system and that a variety of different system environments and configurations are contemplated and are within the scope of the present disclosure. For example, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

FIG. 2 is a block diagram of an example drone management application 120. As depicted, the drone management application 120 may include a drone task manager 202, an input processor 204, and a drone manager 206. It should be understood that the drone management application 120 may include additional components such as, but not limited to, a configuration engine, an encryption/decryption engine, etc., and/or these various components may be combined into a single engine or divided into additional engines. In some embodiments, the drone management application 120 may be implemented in various computing entities of the system 100 and may be configured based on the computing entity in which it is implemented. In some embodiments, the drone management application 120 may be implemented in the management server 101, and optionally configured to enable the drone task manager 202, and disable other components of the drone management application 120. In some embodiments, the drone management application 120 may be implemented in the drone 103 and/or the roadway vehicle 107, and optionally configured to enable the input processor 204 and the drone manager 206, and disable other components of the drone management application 120. In some embodiments, as depicted in FIG. 1A, the drone manager 206 implemented in the drones 103 may update the drone data, the roadway traffic data, the drone task list, and/or other data stored in the server data store 123 of the management server 101 as indicated by the signal line 142. The drone task manager 202 implemented in the management server 101 may update the drone task list and/or other data stored in the drone data store 121 of the drones 103 as indicated by the signal line 140. Other configurations of the drone management application 120 are also possible and contemplated.

The drone task manager 202, the input processor 204, and the drone manager 206 may be implemented as software, hardware, or a combination of the foregoing. In some embodiments, the drone task manager 202, the input processor 204, and the drone manager 206 may be communicatively coupled by the bus and/or the processor 115 to one another and/or to the other components of the computing device 132. In some embodiments, one or more of the components 120, 202, 204, and/or 206 are sets of instructions executable by the processor 115 to provide their functionality. In further embodiments, one or more of the components 120, 202, 204, and/or 206 are storable in the memory 117 and are accessible and executable by the processor 115 to provide their functionality. In any of the foregoing embodiments, these components 120, 202, 204, and/or 206 may be adapted for cooperation and communication with the processor 115 and other components of the computing device 132. The drone management application 120 and its components 202, 204, 206 are described in further detail below with reference to at least FIGS. 3-8B.

Figure 3:
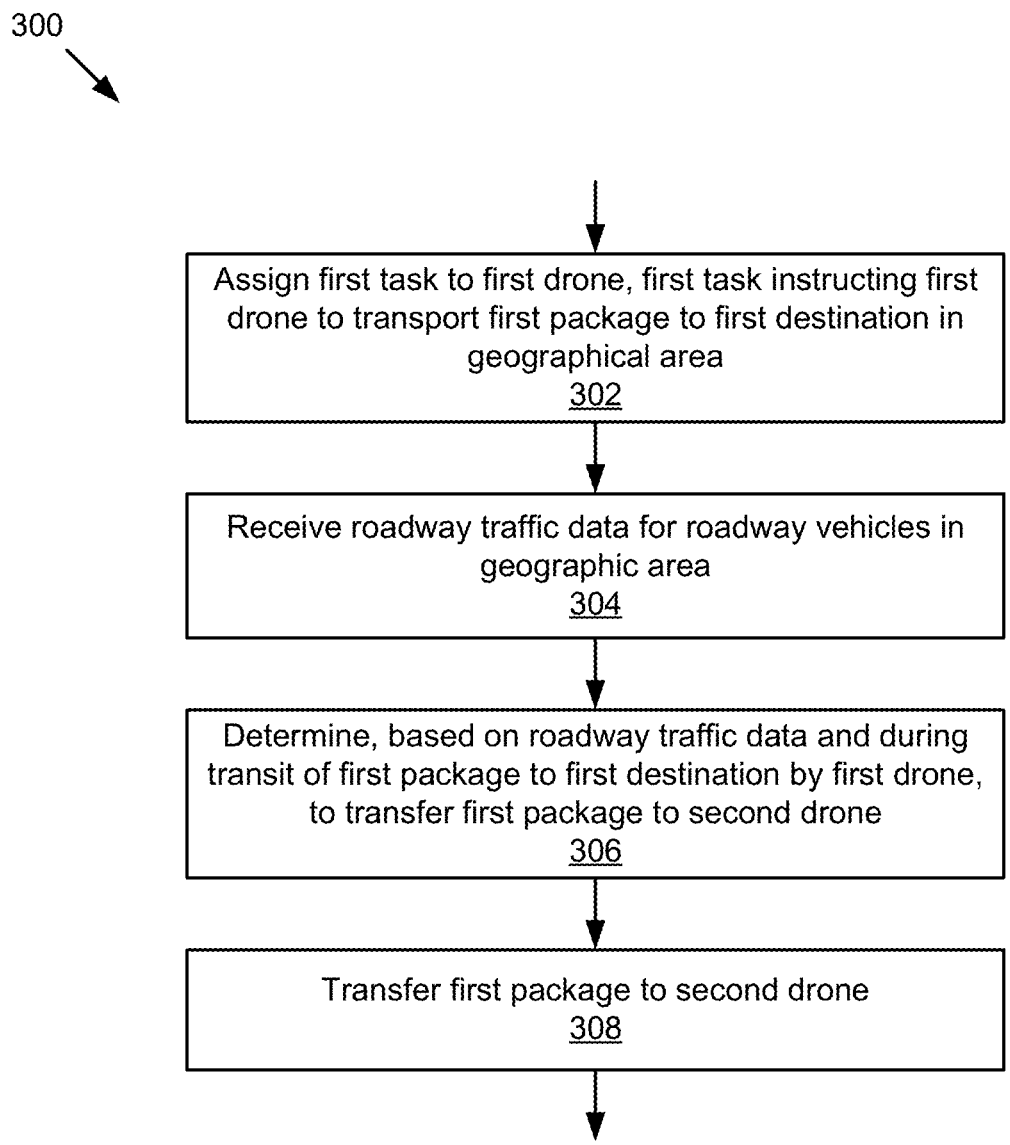
FIG. 3 is a flowchart of an example method for managing drones.

FIG. 3 is a flowchart of an example method 300 for managing drones to improve the likelihood that drone task is successfully completed. In block 302, the drone task manager 202 may assign a first task to a first drone 103 of the drone network, the first task may instruct the first drone 103 to transport a first package to a first destination in the geographic area. In some embodiments, the first destination may be the ultimate destination to which the first package is delivered for the package recipient, or the temporary destination of the first package during the delivery process (e.g., local store, warehouse, courier facility, etc.). In some embodiments, to transport the first package, the first drone 103 may carry the first package and fly to the first destination. Alternatively, the first drone 103 may carry the first package and dock on a first roadway vehicle 107 that is traveling towards the first destination, thereby being transported towards the first destination as the first roadway vehicle 107 proceeds forward.

In block 304, the input processor 204 may receive roadway traffic data for a plurality of roadway vehicles 107 in the geographic area. In some embodiments, the input processor 204 may receive the roadway traffic data describing one or more road segments located between the drone location of the first drone 103 and the first destination associated with the first task. As discussed elsewhere herein, the roadway traffic data may include the roadway data of the road segments and vehicle data of one or more roadway vehicles 107 traveling on these road segments. The roadway data of the road segment may include the roadway status, the drone restriction status, the historical traffic data, the traffic metrics describing the traffic condition of the road segment, etc. The vehicle data of the roadway vehicle 107 may include the vehicle speed, the vehicle acceleration/deceleration rate, the vehicle start point, the vehicle destination point, the vehicle location, the vehicle lane, the vehicle route, the vehicle behavior data, the historical travel data, the vehicle attributes, etc., of the roadway vehicle 107. In some embodiments, the input processor 204 may also receive the drone data associated with one or more second drones 103 that are distinct from the first drone 103. As discussed elsewhere herein, the drone data of the second drone 103 may include the drone location, the current range of the second drone 103, the current drone task being performed by the second drone 103, the package data of the second package associated with the current drone task of the second drone 103, the destination point to which the second package is transported, the subsequent stop point of the second drone 103, the roadway vehicle 107 on which the second drone 103 is currently docked, etc.

In block 306, during the transit of the first package to the first destination by the first drone 103, the drone manager 206 may determine to transfer the first package to a second drone 103 in the drone network. In some embodiments, to determine to transfer the first package to the second drone 103 in the drone network, the drone manager 206 may rely on the roadway traffic data to determine whether the first package is to be transferred in order to successfully transport the first package to the first destination. If the first package is to be transferred, the first drone 103 may couple to the second drones 103 located within a predefined distance from its drone location to establish the drone network (e.g., 300 m), and the drone manager 206 may rely on the roadway traffic data to determine the second drone 103 in the drone network to which the first package is transferred. In block 308, the first drone 103 may transfer the first package to the second drone 103 in the drone network.

In some embodiments, instead of transferring the first package to the second drone 103, the drone manager 206 may perform other operations so that the first package can be successfully transported to the first destination. In some embodiments, the drone manager 206 may analyze the roadway traffic data and the drone data to determine suitable operation for the first drone 103. Available operations for the first drone 103 may include: stop flying and dock on a first roadway vehicle 107, remain situating on the first roadway vehicle 107, navigate to dock on a second roadway vehicle 107 that is different from the first roadway vehicle 107, transfer the first package to a second drone 103 (e.g., perform package handover or task exchange with the second drone 103), or transport the first package to a nearby temporary location (e.g., warehouse, courier facility), etc. Other operations of the first drone 103 are also possible and contemplated.

Figure 4:
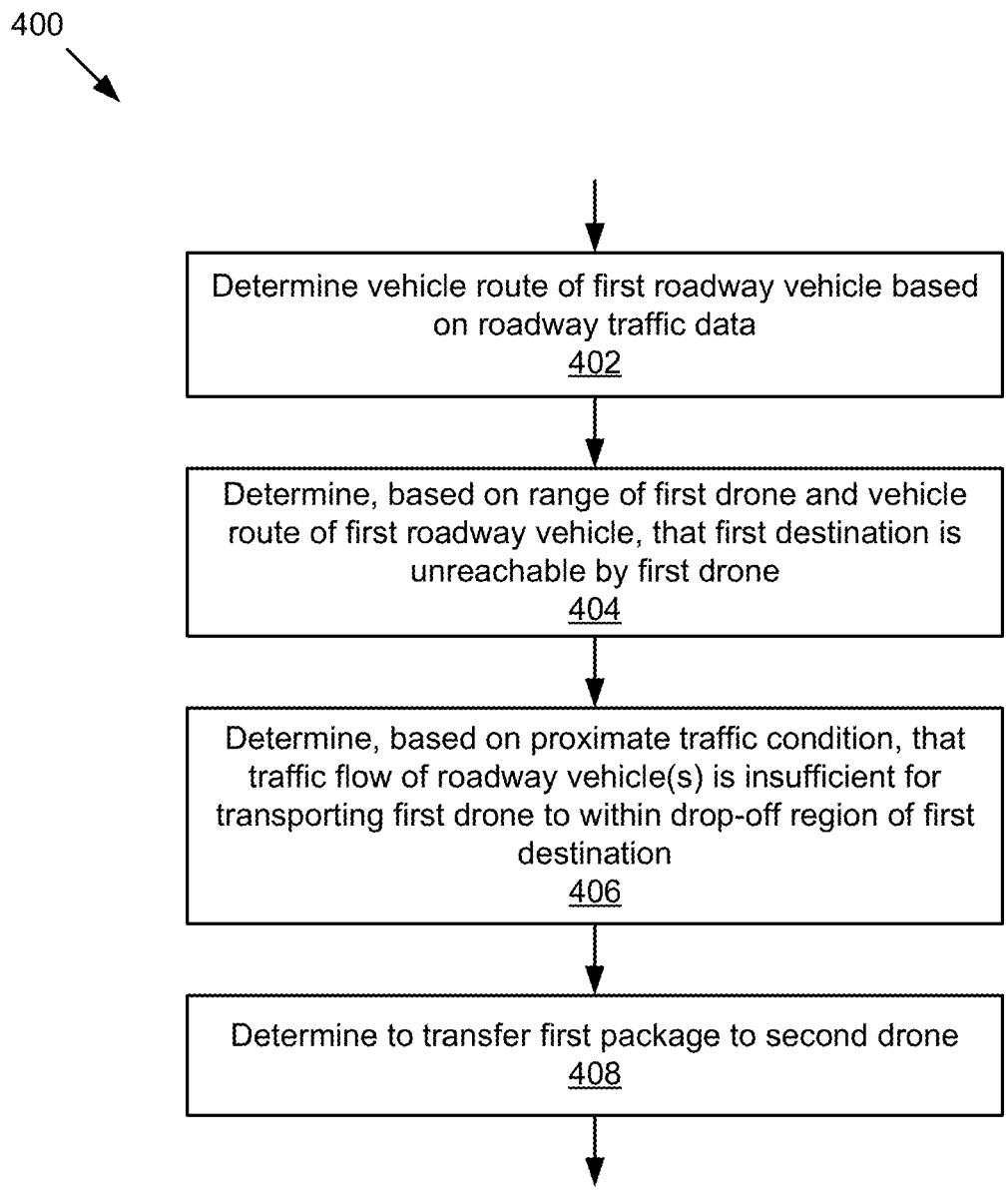
FIG. 4 is a flowchart of an example method for determining whether a first package is to be transferred.

FIG. 4 is a flowchart of an example method 400 for determining whether the first package is to be transferred in order to successfully transport the first package to the first destination in the geographic area. As discussed above, the first package may currently be transported by the first drone 103, and the first drone 103 may dock on a first roadway vehicle 107 that is traveling towards the first destination. In some embodiments, as the first roadway vehicle 107 is traveling towards the first destination, the distance between the first roadway vehicle 107 and the first destination may decrease over time. On the other hand, as the first roadway vehicle 107 is traveling away from the first destination, the distance between the first roadway vehicle 107 and the first destination may increase over time.

In block 402, the drone manager 206 may determine the vehicle route of the first roadway vehicle 107 on which the first drone is docked based on the roadway traffic data. In some embodiments, the vehicle data of the first roadway vehicle 107 may include the vehicle route of the first roadway vehicle 107, and thus the drone manager 206 may extract the vehicle route of the first roadway vehicle 107 from the vehicle data of the first roadway vehicle 107 in the roadway traffic data. In some embodiments, the vehicle data of the first roadway vehicle 107 may not include the vehicle route of the first roadway vehicle 107. In that situation, the drone manager 206 may analyze the vehicle data of the first roadway vehicle 107 (e.g., the vehicle start point, the vehicle destination point, the vehicle lane, the vehicle acceleration/deceleration rate, the vehicle behavior data, the historical travel data, etc.) and the roadway data of the road segments (e.g., the roadway status, the traffic metrics, the historical traffic data, etc.), and predict the vehicle route of the first roadway vehicle 107 based on the vehicle data and/or the roadway data. For example, the drone manager 206 may determine that the first roadway vehicle 107 made a lane change to the rightmost lane and decelerated, and thus determine that the first roadway vehicle 107 is likely to make a right turn at the upcoming intersection and then proceed straight to the vehicle destination point. As another example, the drone manager 206 may determine that the road segment is closed due to a traffic accident, and thus determine that the first roadway vehicle 107 is likely to make a left turn at the intersection to take a detour.

In some embodiments, the drone manager 206 may determine whether the first package is to be transferred based on the current range of the first drone 103 and the vehicle route of the first roadway vehicle 107. In block 404, the drone manager 206 may determine that the first destination is unreachable by the first drone 103 based on the current range of the first drone 103 and the vehicle route of the first roadway vehicle 107 on which the first drone 103 is docked. In some embodiments, the drone manager 206 may determine on the vehicle route of the first roadway vehicle 107 a part-way location at which the first roadway vehicle 107 may travel away from the first destination, and thus the first roadway vehicle 107 will no longer transport the first drone 103 closer to the first destination at that point. The drone manager 206 may determine that the distance between the part-way location and the first destination is higher than the flight distance that the first drone 103 can fly as indicated by the range of the first drone 103, and thus determine that the first drone 103 cannot reach the first destination.

In block 406, the drone manager 206 may determine, based on a proximate traffic condition, that a traffic flow of one or more roadway vehicles 107 is insufficient for transporting the first drone 103 to within a drop-off region of the first destination. The drop-off region of the first destination may be the region in which a drone 103 transporting the first package may undock from the roadway vehicle 107 on which the drone 103 is situated, and fly to drop off the first package at the first destination within the drop-off region. In some embodiments, the drop-off region of the first destination may remain unchanged (e.g., 50 m from the front porch) or may vary depending on the range of the drone 103 transporting the first package (e.g., 50% of the range of the drone 103).

In some embodiments, the drone manager 206 may analyze the traffic condition at one or more proximate locations on the vehicle route of the first roadway vehicle 107, the proximate locations may be located between the vehicle location of the first roadway vehicle 107 and the part-way location at which the first roadway vehicle 107 may travel away from the first destination. In some embodiments, the proximate locations may be located within a predefined distance from the vehicle location of the first roadway vehicle 107 (e.g., 300 m). Alternatively, the proximate locations may be located within a predefined distance from the part-way location (e.g., 350 m). In some embodiments, the drone manager 206 may determine whether the traffic flow of one or more roadway vehicles 107 at these proximate locations is sufficient to transport the first drone 103 to within the drop-off region of the first destination. In some embodiments, the drone manager 206 may determine the traffic flow rate of the roadway vehicles 107 at the proximate location, and determine whether the traffic flow rate of the roadway vehicles 107 satisfies a traffic flow rate threshold. Alternatively, the drone manager 206 may determine the traffic flow rate of the roadway vehicles 107 that likely travel towards the first destination at the proximate location, or the traffic flow rate of the roadway vehicles 107 that likely travel to the start point of the drop-off region at the proximate location, and determine whether the traffic flow rate of these roadway vehicles 107 satisfies the traffic flow rate threshold. If the traffic flow rate of the roadway vehicles 107 satisfies the traffic flow rate threshold (e.g., less than 3000 vehicles/h), the drone manager 206 may determine that the traffic flow of the roadway vehicles 107 at the proximate location is insufficient to transport the first drone 103 carrying the first package to within the drop-off region of the first destination.

In block 408, the drone manager 206 may determine to transfer the first package to a second drone 103 based on the first destination being unreachable by the first drone 103 and the traffic flow of the roadway vehicles 107 at the proximate location being insufficient. Thus, as discussed above, the distance between the part-way location at which the first roadway vehicle 107 may travel away from the first destination and the first destination is higher than the flight distance that the first drone 103 can fly, and therefore the first drone 103 cannot reach the first destination. The traffic flow of the roadway vehicles 107 at the proximate location between the vehicle location of the first roadway vehicle 107 and the part-way location is insufficient, and therefore the first drone 103 may unlikely be able to get on another roadway vehicle 107 that is traveling towards the first destination before the first roadway vehicle 107 reaches the part-way location on its vehicle route. As a result, the drone manager 206 may determine that the first package is to be transferred.

In some embodiments, in addition to the roadway traffic data, the drone manager 206 may determine to transfer the first package to a second drone 103 based on other factors. For example, the drone manager 206 may analyze the roadway traffic data, and determine that the traffic metric(s) of one or more road segments in the vehicle route of the first roadway vehicle 107 satisfies the corresponding traffic metric threshold(s) (e.g., the average vehicle speed is less than 15 mph, the average following distance is less than 1 m, etc.), and thus determine that a traffic congestion occurs on the vehicle route of the first roadway vehicle 107. In some embodiments, if the drone manager 206 determines that the traffic congestion occurs on the vehicle route of the first roadway vehicle 107 on which the first drone 103 is docked, and that the package urgency level of the first package satisfies a package urgency level threshold (e.g., higher than 75%), the drone manager 206 may determine that the first package is to be transferred from the first drone 103 to a second drone 103 so that the first package can be timely transmitted to the first destination. Other factors and implementations for determining whether the first package is to be transferred are also possible and contemplated.

Figure 8A:
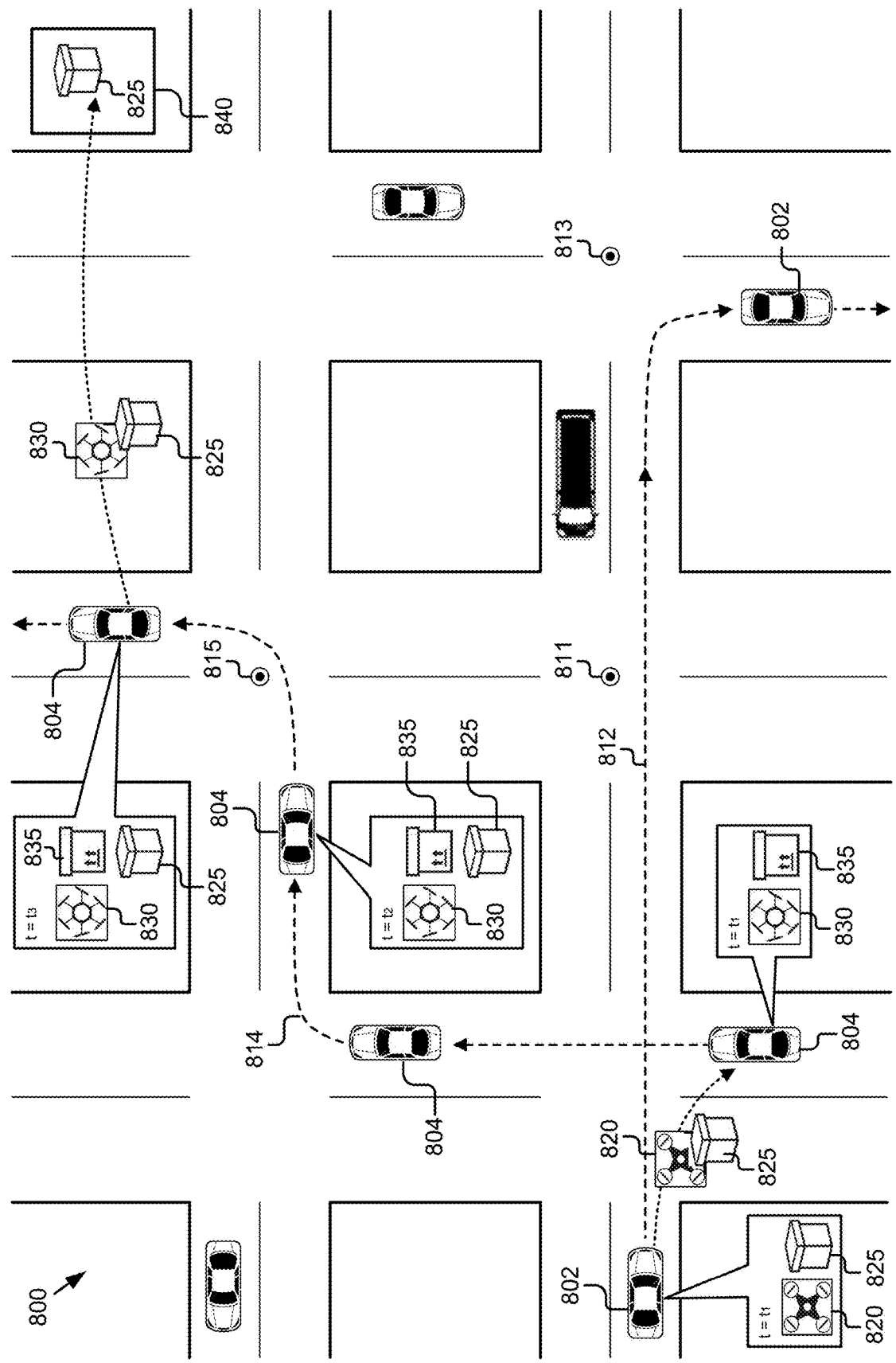
FIGS. 8A and 8B illustrate example scenarios in which the first drone and the second drone perform the package handover of the first package from the first drone to the second drone.

As an example, FIG. 8A illustrates an example scenario 800 in which the first drone 820 may be assigned a first task of transporting the first package 825 to the first destination 840. The first drone 820 may dock on the first roadway vehicle 802, and thus may be transported towards the first destination 840 as the first roadway vehicle 802 travels along the vehicle route 812. In this example, the drone manager 206 may determine on the vehicle route 812 the part-way location 813 at which the first roadway vehicle 802 may travel away from the first destination 840. The drone manager 206 may determine that the distance between the part-way location 813 and the first destination 840 (e.g., 500 m) is higher than the current range of the first drone 820 (e.g., 200 m), and thus determine that the first drone 820 cannot reach the first destination 840.

The drone manager 206 may then determine the traffic condition at one or more proximate locations between the vehicle location of the first roadway vehicle 802 and the part-way location 813. For example, the drone manager 206 may determine the traffic flow of the roadway vehicles 107 at the proximate location 811. In this example, the proximate location 811 may be the intersection on the vehicle route 812 that is directly adjacent to the vehicle location of the first roadway vehicle 802 on its moving direction. The drone manager 206 may determine that the traffic flow rate at the proximate location 811 satisfies the traffic flow rate threshold (e.g., less than 3000 vehicles/h). Therefore, the drone manager 206 may determine that the traffic flow of the roadway vehicles 107 at the proximate location 811 is insufficient, and thus the first drone 820 may unlikely be able to get on another roadway vehicle 107 that can transport the first drone 820 towards the first destination 840 at the proximate location 811. As the first drone 820 cannot fly from the part-way location 813 to the first destination 840, and the first drone 820 may unlikely be able to dock on another roadway vehicle 107 that is traveling towards the first destination 840 before the first roadway vehicle 802 moving away from the first destination 840 at the part-way location 813, the drone manager 206 may determine that the first package 825 is to be transferred.

In some embodiments, the drone manager 206 may determine the second drone 103 to which the first package is transferred. In some embodiments, to transfer the first package, the first drone 103 may perform a package handover of the first package from the first drone 103 to the second drone 103, and the second drone 103 may then transport the first package. Alternatively, the second drone 103 may currently transport a second package, and the first drone 103 may perform a task exchange with the second drone 103. Thus, the second drone 103 may then transport the first package, and the first drone 103 may then transport the second package.

In some embodiments, to perform the package handover of the first package, the drone manager 206 may select the second drone 103 to which the first package will be handed over. In some embodiments, the drone manager 206 may determine the vehicle route of the roadway vehicles 107 on which other drones 103 of the drone network are docked, and select the second drone 103 from the other drones 103 based on the vehicle route of the second roadway vehicle 107 that is currently transporting the second drone 103. As discussed elsewhere herein, the other drones 103 in the drone network may be located within the predefined distance from the drone location of the first drone 103 (e.g., 300 m). In some embodiments, the drone manager 206 may determine the vehicle route of the roadway vehicles 107 on which the other drones 103 are docked based on the roadway traffic data in a manner similar to determining the vehicle route of the first roadway vehicle 107 on which the first drone 103 is docked as discussed above with reference to FIG. 4.

Figure 5A:
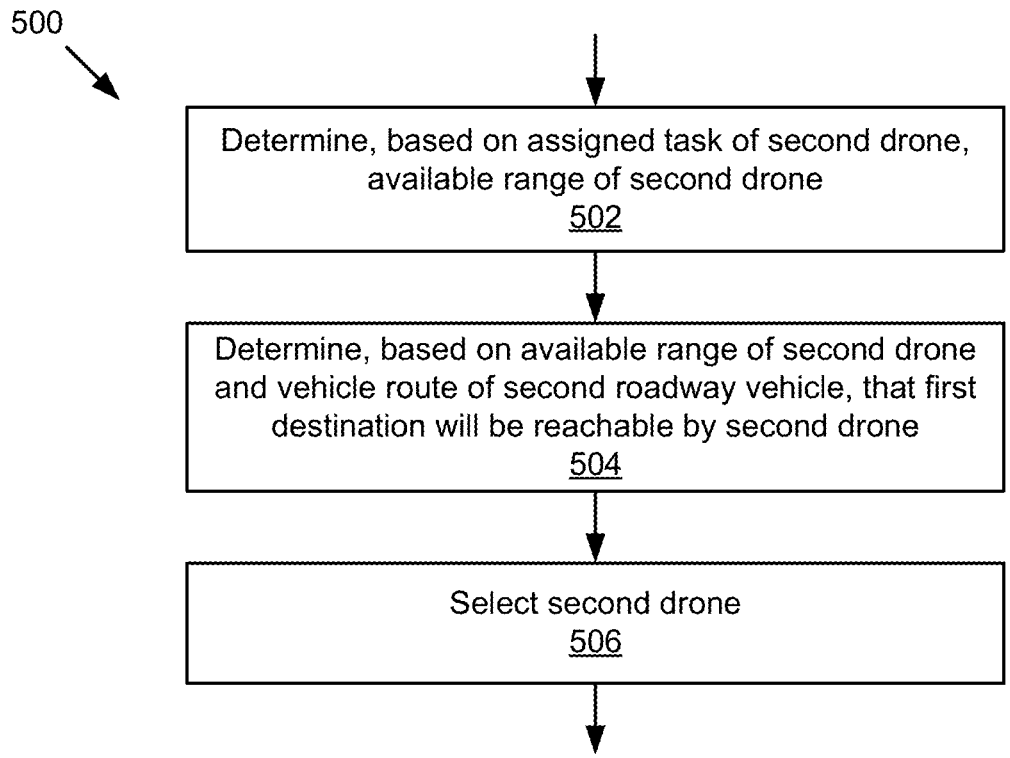
FIGS. 5A-5B are flowcharts of example methods for selecting a second drone to perform a package handover of the first package from the first drone to the second drone.

FIG. 5A is a flowchart of example method 500 for selecting the second drone 103 to perform the package handover of the first package from the first drone 103 to the second drone 103. The first package will be transported by the second drone 103 as a result of the package handover, and therefore the drone manager 206 may select the second drone 103 that is docked on the second roadway vehicle 107 currently traveling towards the first destination in the geographic area. In block 502, the drone manager 206 may determine the available range of the second drone 103 based on the assigned task of the second drone 103. In some embodiments, the second drone 103 may itself be assigned a second task, and the second task may instruct the second drone 103 to transport a second package to a second destination. In some embodiments, the drone manager 206 may determine the unallocated flight distance that the second drone 103 can fly in addition to the flight distance to transport the second package to the second destination to complete the second task, and determine the available range of the second drone 103 to be the unallocated flight distance.

In block 504, the drone manager 206 may determine that if the second drone 103 transports the first package, the first destination will be reachable by the second drone 103. The drone manager 206 may determine that the first destination will be reachable by the second drone 103 based on the available range of the second drone 103 and the vehicle route of the second roadway vehicle 107 on which the second drone 103 is docked. As discussed above, the second roadway vehicle 107 on which the second drone 103 is docked may currently travel towards the first destination. The drone manager 206 may determine on the vehicle route of the second roadway vehicle 107 a part-way location at which the second roadway vehicle 107 may start to travel away from the first destination, and thus the second roadway vehicle 107 will no longer transport the second drone 103 closer to the first destination at that point. The drone manager 206 may determine that the distance between the part-way location and the first destination is lower than the flight distance that the second drone 103 can additionally fly as indicated by the available range of the second drone 103, and thus determine that the second drone 103 can reach the first destination. In block 506, the drone manager 206 may select the second drone 103 to perform the package handover of the first package.

Continuing the example in FIG. 8A, the drone manager 206 may determine a second drone 830 in the drone network, the second drone 830 may be located within a predefined distance from the drone location of the first drone 820. In this example, the second drone 830 may currently transport the second package 835 to a second destination to perform a second task, and the second drone 830 may dock on a second roadway vehicle 804 that is traveling towards the first destination 840. The drone manager 206 may determine the available range that the second drone 830 can additionally fly (e.g., 450 m) given the flight distance allocated for transporting the second package 835 to the second destination (e.g., 200 m). The drone manager 206 may determine on the vehicle route 814 of the second roadway vehicle 804 the part-way location 815 at which the second roadway vehicle 804 may travel away from the first destination 840, and determine that the distance between the part-way location 815 and the first destination 840 (e.g., 300 m) is lower than the available range of the second drone 830 (e.g., 450 m). Therefore, the drone manager 206 may determine that the second drone 830 can reach the first destination 840, and the second drone 103 is capable of transporting the first package 825 to the first destination 840 in addition to transporting the second package 835 to the second destination. Thus, the drone manager 206 may select the second drone 830 to perform the package handover of the first package 825 from the first drone 802, and reassign the first task to the second drone 830. The reassigned first task may instruct the second drone 830 to transport the first package 825 to the first destination 840 in the geographic area.

In some embodiments, once the second drone 103 is selected, the drone manager 206 implemented in the first drone 103 and the second drone 103 may coordinate the package handover of the first package from the first drone 103 to the second drone 103. Continuing the example in FIG. 8A, the first drone 820 may carry the first package 825 and navigate from the first roadway vehicle 802 to the second roadway vehicle 804. The first drone 820 may release the first package 825 onto the second roadway vehicle 804, and the second drone 830 may pick up the first package 825 from the second roadway vehicle 804. Alternatively, the first drone 820 may transfer the first package 825 directly to the second drone 830. Other implementations for coordinating the package handover of the first package are also possible and contemplated.

As illustrated in FIG. 8A, once the package handover of the first package 825 is completed, the second drone 830 may carry both first package 825 and second package 835. The first drone 820 may then navigate to its subsequent stop point, and the second drone 830 may be transported towards the first destination 840 by the second roadway vehicle 804. As the second roadway vehicle 804 reaches the part-way location 815 at which the second roadway vehicle 804 starts to travel away from the first destination 840, the second drone 830 may carry the first package 825 and fly to the first destination 840, thereby transporting the first package 825 to the first destination 840 to complete the first task. Once the first task is completed, the second drone 830 may receive the vehicle location of the second roadway vehicle 804, and navigate back to the second roadway vehicle 804 to perform the second task of transporting the second package 835 to the second destination. If the second drone 830 already transported the second package 835 to the second destination prior to transporting the first package 825 to the first destination 840, the second drone 830 may navigate to its subsequent stop point (e.g., charging station, courier facility, pick-up point of the subsequent drone task, etc.).

Figure 5B:
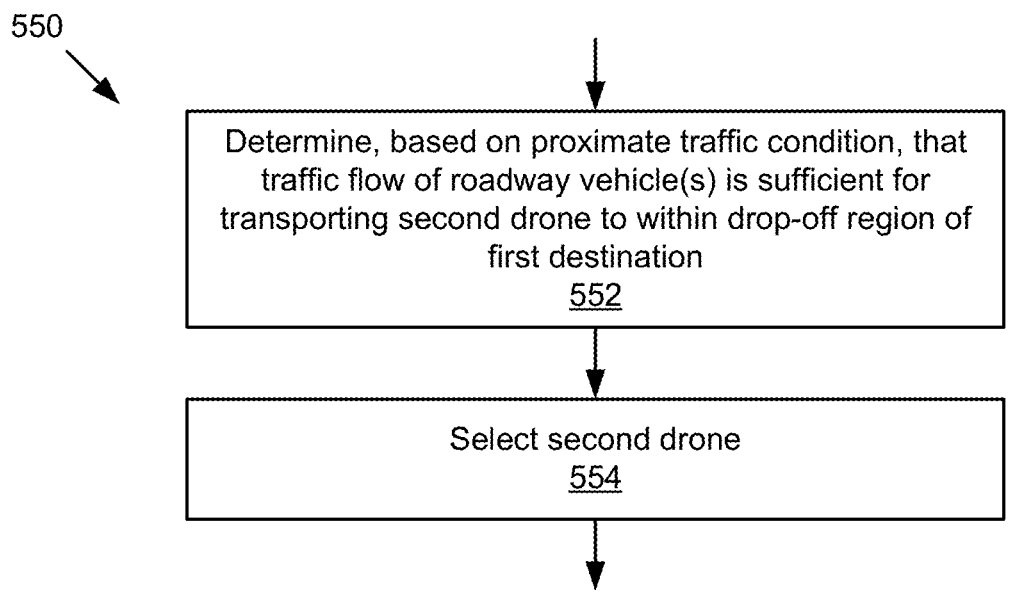

FIG. 5B is a flowchart of another example method 550 for selecting the second drone 103 to perform the package handover of the first package from the first drone 103 to the second drone 103. As discussed above, the first package will be transported by the second drone 103 as a result of the package handover, and therefore the drone manager 206 may select the second drone 103 that is docked on the second roadway vehicle 107 currently traveling towards the first destination in the geographic area. In block 552, the drone manager 206 may determine that if the second drone 103 transports the first package, a traffic flow of one or more roadway vehicles 107 is sufficient for transporting the second drone 103 to within the drop-off region of the first destination. The drone manager 206 may determine that the traffic flow of the one or more roadway vehicles 107 is sufficient based on a proximate traffic condition. As discussed elsewhere herein, the drop-off region of the first destination may be the region in which the drone 103 transporting the first package may fly to drop off the first package at the first destination within the drop-off region.

In some embodiments, the drone manager 206 may determine the vehicle route of the second roadway vehicle 107 on which the second drone 103 is docked, and determine on the vehicle route of the second roadway vehicle 107 the part-way location at which the second roadway vehicle 107 may travel away from the first destination. The drone manager 206 may analyze the traffic condition at one or more proximate locations on the vehicle route of the second roadway vehicle 107, the proximate locations may be located between the vehicle location of the second roadway vehicle 107 and the part-way location at which the second roadway vehicle 107 may travel away from the first destination. In some embodiments, the drone manager 206 may determine the traffic flow rate of the roadway vehicles 107 at the proximate location, and determine whether the traffic flow rate of the roadway vehicles 107 satisfies a traffic flow rate threshold. Alternatively, the drone manager 206 may determine the traffic flow rate of the roadway vehicles 107 that likely travel towards the first destination at the proximate location, or the traffic flow rate of the roadway vehicles 107 that likely travel to the start point of the drop-off region at the proximate location, and determine whether the traffic flow rate of these roadway vehicles 107 satisfies the traffic flow rate threshold. If the traffic flow rate of the roadway vehicles 107 satisfies the traffic flow rate threshold (e.g., more than 3200 vehicles/h), the drone manager 206 may determine that the traffic flow of the roadway vehicles 107 at the proximate location is sufficient to transport the second drone 103 carrying the first package to within the drop-off region of the first destination, or to transport another drone 103 that may receive the first package from the second drone 103 at the proximate location to within the drop-off region of the first destination. In block 554, the drone manager 206 may select the second drone 103 to perform the package handover of the first package.

Figure 8B:
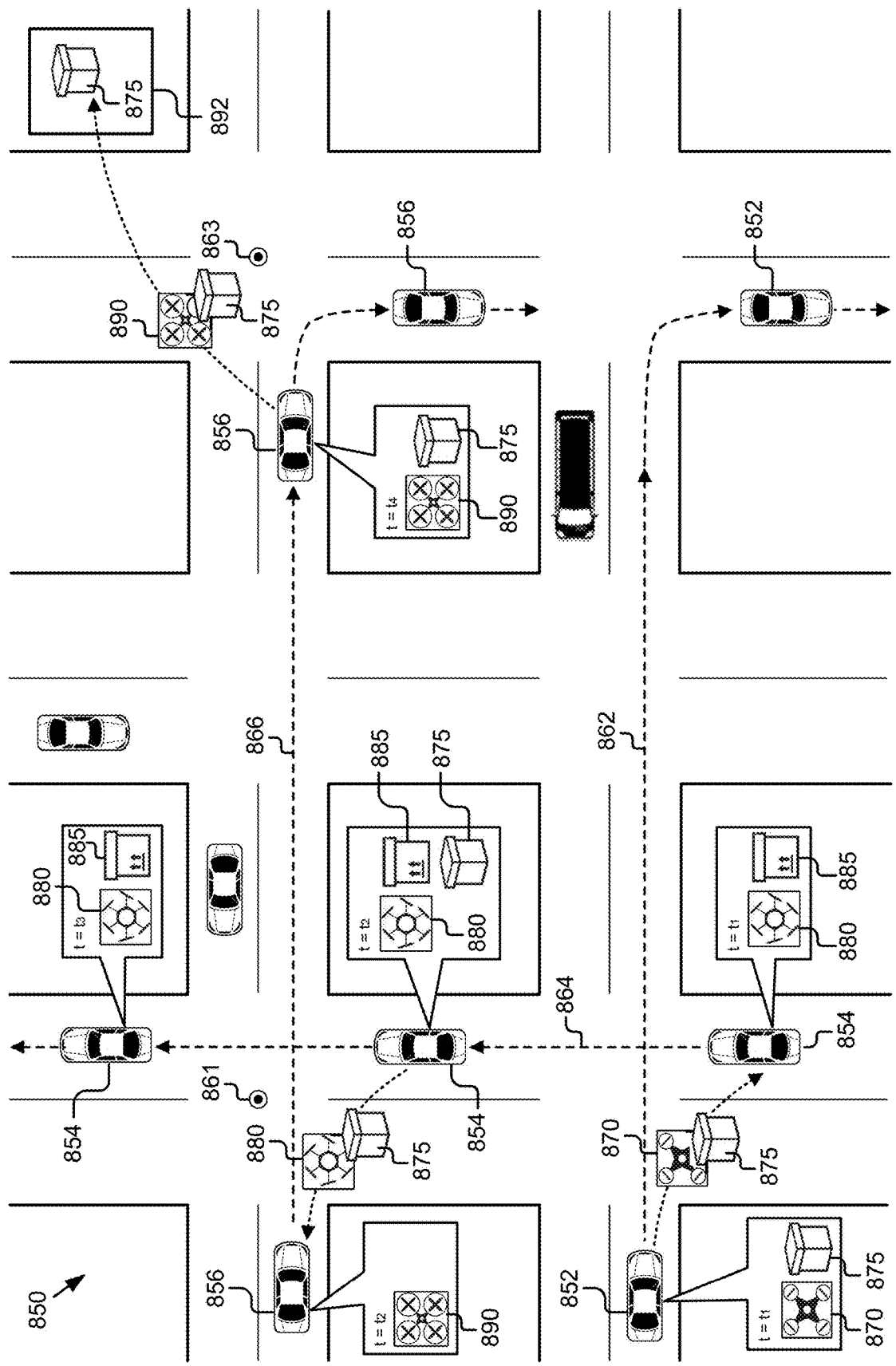

As an example, FIG. 8B illustrates an example scenario 850 in which the first drone 870 may be assigned a first task of transporting the first package 875 to the first destination 892. The first drone 870 may dock on the first roadway vehicle 852 that is traveling along the vehicle route 862. In this example, the drone manager 206 may determine that the first package 875 is to be transferred so that the first package 875 can be successfully transported to the first destination 892. The drone manager 206 may determine a second drone 880 in the drone network, the second drone 880 may be located within a predefined distance from the drone location of the first drone 870. The second drone 880 may dock on a second roadway vehicle 854 that is traveling towards the first destination 892. The drone manager 206 may determine the vehicle route 864 of the second roadway vehicle 854, and determine on the vehicle route 864 the part-way location 861 at which the second roadway vehicle 854 may start traveling away from the first destination 892. The drone manager 206 may determine that the distance between the part-way location 861 and the first destination 892 (e.g., 950 m) is higher than the available range of the second drone 880 (e.g., 450 m), and thus determine that the second drone 880 cannot reach the first destination 892.

The drone manager 206 may then determine the traffic condition at one or more proximate locations between the vehicle location of the second roadway vehicle 854 and the part-way location 861. For example, the drone manager 206 may determine the traffic flow of the roadway vehicles 107 at the part-way location 861. The drone manager 206 may determine that the traffic flow rate at the part-way location 861 satisfies the traffic flow rate threshold (e.g., more than 3200 vehicles/h), and thus determine that the traffic flow of the roadway vehicles 107 at the part-way location 861 is sufficient. Therefore, the drone manager 206 may determine that although the second drone 880 cannot reach the first destination 892, the second drone 880 may likely be able to get on another roadway vehicle 107 that can transport the second drone 880 towards the first destination 892 at the part-way location 861, or to transfer the first package 875 to a third drone 103 that can reach the first destination 892 at the part-way location 861. Thus, the drone manager 206 may select the second drone 880 to perform the package handover of the first package 875 from the first drone 870, and reassign the first task to the second drone 880. The reassigned first task may instruct the second drone 880 to transport the first package 825 to the first destination 840 in the geographic area.

As depicted in FIG. 8B, once the second drone 880 is selected, the drone manager 206 implemented in the first drone 870 and the second drone 880 may coordinate the package handover of the first package 875 from the first drone 870 to the second drone 880. As a result of the package handover, the second drone 880 may carry the first package 875 together with its own package, if any (e.g., the second package 885). The first drone 870 may then navigate to its subsequent stop point, and the second drone 880 may be transported towards the first destination 892 by the second roadway vehicle 854.

As the second roadway vehicle 854 reaches the part-way location 861 at which the second roadway vehicle 854 starts to travel away from the first destination 892, the second drone 880 may carry the first package 875 and get on a third roadway vehicle 107 that can transport the second drone 880 closer to the first destination 892. For example, the drone manager 206 implemented in the second drone 880 may determine the vehicle route of the third roadway vehicle 107 that is located within a predefined distance from the drone location of the second drone 880, and determine that the third roadway vehicle 107 is traveling towards the first destination 892. The second drone 880 may then carry the first package 875, and navigate to dock on the third roadway vehicle 107, thereby being transported towards the first destination 892 by the third roadway vehicle 107. Alternatively, as the second roadway vehicle 854 reaches the part-way location 861, the second drone 880 may transfer the first package 875 to a third drone 103 that can reach the first destination 892 or can later on transfer the first package 875 to another drone 103 to transport the first package 875 towards the first destination 892. For example, the drone manager 206 implemented in the second drone 880 may determine the third drone 890 using the method 500 and/or the method 550 discussed above with reference to FIGS. 5A and 5B, and reassign the first task to the third drone 890. The reassigned first task may instruct the third drone 890 to transport the first package 875 to the first destination 892.

Once the third drone 890 is selected, the second drone 880 and the third drone 890 may coordinate the package handover of the first package 875 from the second drone 880 to the third drone 890, and thus the third drone 890 may then carry the first package 875. As depicted in FIG. 8B, the third drone 890 may dock on the third roadway vehicle 856, and the third roadway vehicle 856 may transport the third drone 890 towards the first destination 892. In this example, as the third roadway vehicle 856 reaches the part-way location 863 at which the third roadway vehicle 856 starts to travel away from the first destination 892, the third drone 890 may carry the first package 875 and fly to the first destination 892, thereby transporting the first package 875 to the first destination 892 to complete the first task.

As discussed elsewhere herein, to transfer the first package to a second drone 103 in the drone network, instead of performing the package handover of the first package from the first drone 103 to the second drone 103, the first drone 103 may perform a task exchange with the second drone 103. In some embodiments, the drone task manager 202 may assign a second task to the second drone 103, the second task may instruct the second drone 103 to transport a second package to a second destination in the geographic area. The second destination associated with the second task may be distinct from the first destination associated with the first task. In some embodiments, the drone manager 206 may determine to reassign the first task to the second drone 103 and reassign the second task to the first drone 103 based on a priority of the task being fulfilled (e.g., priority of the package(s), the current range of the first drone 103, the current range of the second drone 103, the battery level of the first drone 103, the battery level of the second drone 103, the traffic condition associated with the vehicle route of the first roadway vehicle 107 on which the first drone 103 is currently docked, the traffic condition associated with the vehicle route of the second roadway vehicle 107 on which the second drone 103 is currently docked, etc. As a result of the task exchange between the first drone 103 and the second drone 103, the second drone 103 may then transport the first package to the first destination, and the first drone 103 may then transport the second package to the second destination.

Figure 6A:
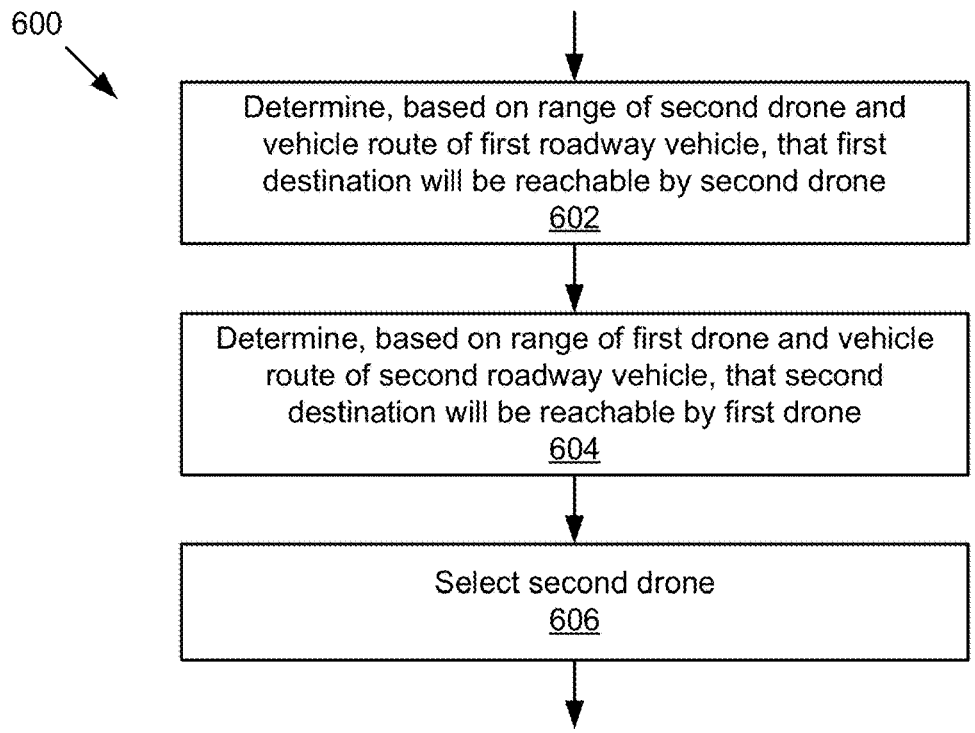
FIGS. 6A-6B are flowcharts of example methods for selecting a second drone to perform a task exchange between the first drone and the second drone.

FIG. 6A is a flowchart of example method 600 for selecting the second drone 103 to perform the task exchange between the first drone 103 and the second drone 103. In block 602, the drone manager 206 may determine that if the second drone 103 transports the first package, the first destination will be reachable by the second drone 103. The drone manager 206 may determine that the first destination will be reachable by the second drone 103 based on the range of the second drone 103 and the vehicle route of the first roadway vehicle 107 on which the first drone 103 is currently docked. In some embodiments, the drone manager 206 may determine on the vehicle route of the first roadway vehicle 107 a part-way location at which the first roadway vehicle 107 may start to travel away from the first destination. The drone manager 206 may determine that the distance between the part-way location and the first destination is lower than the flight distance that the second drone 103 can fly as indicated by the range of the second drone 103, and thus determine that the second drone 103 can reach the first destination. As discussed elsewhere herein, the range of the second drone 103 may depend on the energy level (e.g., remaining battery level) and/or other operation constraints of the second drone 103.

In block 604, the drone manager 206 may determine that if the first drone 103 transports the second package, the second destination will be reachable by the first drone 103. The drone manager 206 may determine that the second destination will be reachable by the first drone 103 based on the range of the first drone 103 and the vehicle route of the second roadway vehicle 107 on which the second drone 103 is currently docked. In some embodiments, the drone manager 206 may determine on the vehicle route of the second roadway vehicle 107 a part-way location at which the second roadway vehicle 107 may start to travel away from the second destination. The drone manager 206 may determine that the distance between the part-way location and the second destination is lower than the flight distance that the first drone 103 can fly as indicated by the range of the first drone 103, and thus determine that the first drone 103 can reach the second destination. As discussed elsewhere herein, the range of the first drone 103 may depend on the energy level (e.g., remaining battery level) and/or other operation constraints of the first drone 103.

Thus, the drone manager 206 may determine that although the first drone 103 cannot reach the first destination, the first drone 103 can reach the second destination if the first drone 103 docks on the second roadway vehicle 107, and the second drone 103 can reach the first destination if the second drone 103 docks on the first roadway vehicle 107. Therefore, the drone manager 206 may determine that the first drone 103 is capable of transporting the second package to the second destination to complete the second task that is currently assigned to the second drone 103, and the second drone 103 is capable of transporting the first package to the first destination to complete the first task that is currently assigned to the first drone 103. In block 606, the drone manager 206 may select the second drone 103 to perform the task exchange between the first drone 103 and the second drone 103.

Figure 7A:
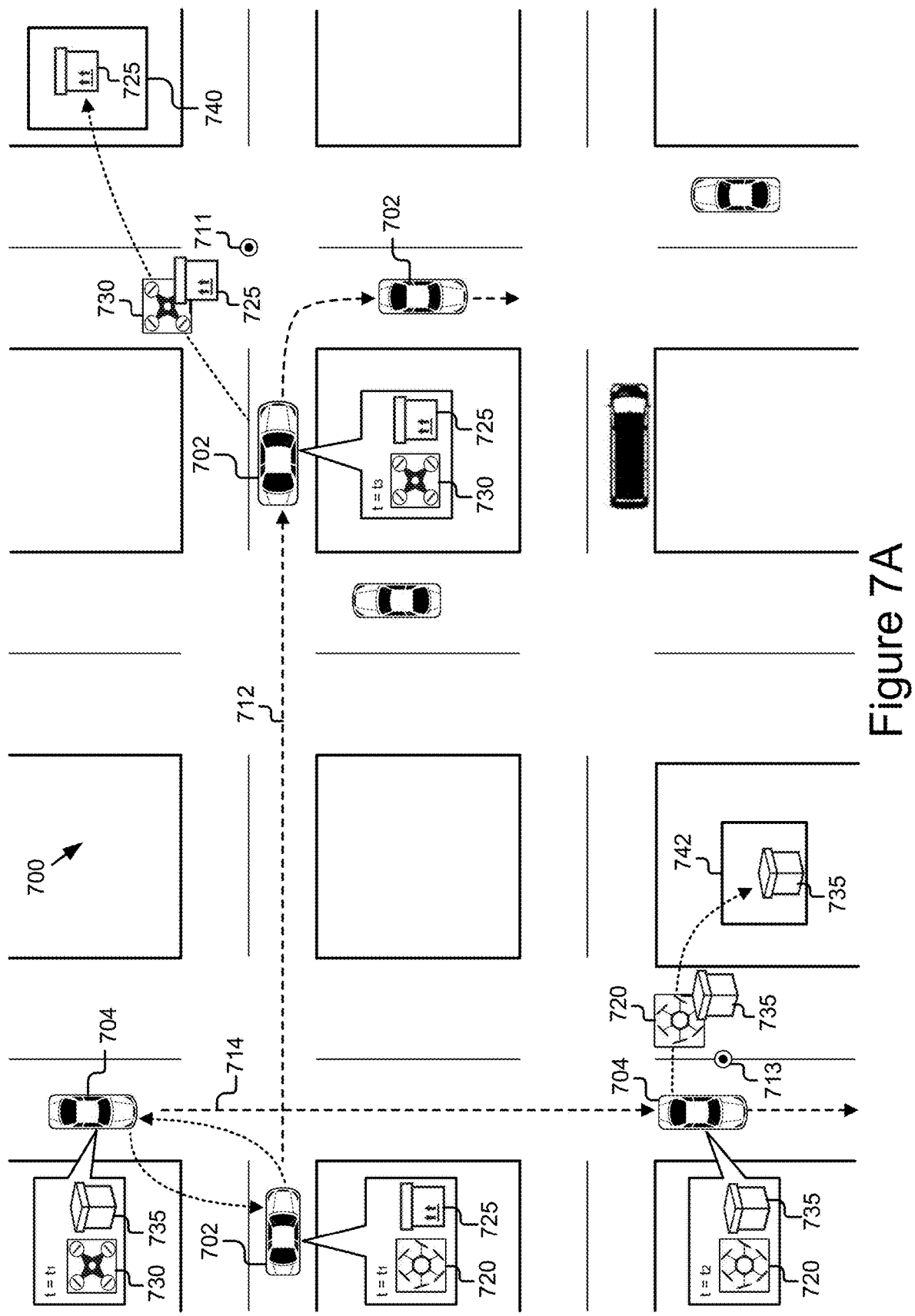
FIGS. 7A and 7B illustrate example scenarios in which the first drone and the second drone perform the task exchange.

As an example, FIG. 7A illustrates an example scenario 700 in which the first drone 720 may be assigned a first task of transporting the first package 725 to the first destination 740, the first drone 720 may dock on a first roadway vehicle 702 that is traveling towards the first destination 740. In this example, the drone manager 206 may determine that the first drone 720 cannot reach the first destination 740, and thus determine that the first package 725 is to be transferred. The drone manager 206 may determine a second drone 730 in the drone network, the second drone 730 may be located within a predefined distance from the drone location of the first drone 720. The second drone 730 may be assigned a second task of transporting the second package 735 to the second destination 742, and the second drone 730 may dock on a second roadway vehicle 704 that is traveling towards the second destination 742.

The drone manager 206 may determine the vehicle route 712 of the first roadway vehicle 702, and determine on the vehicle route 712 the part-way location 711 at which the first roadway vehicle 702 may start traveling away from the first destination 740. The drone manager 206 may determine that the distance between the part-way location 711 and the first destination 740 (e.g., 450 m) is lower than the current range of the second drone 730 (e.g., 750 m), and thus determine that the second drone 730 is capable of transporting the first package 725 to the first destination 740 if the second drone 730 is to be docked on the first roadway vehicle 702. The drone manager 206 may determine the vehicle route 714 of the second roadway vehicle 704, and determine on the vehicle route 714 the part-way location 713 at which the second roadway vehicle 704 may start traveling away from the second destination 742. The drone manager 206 may determine that the distance between the part-way location 713 and the second destination 742 (e.g., 100 m) is lower than the current range of the first drone 720 (e.g., 250 m), and thus determine that the first drone 720 is capable of transporting the second package 735 to the second destination 742 if the first drone 720 is to be docked on the second roadway vehicle 704. Thus, as the second drone 730 is capable of transporting the first package 725 to the first destination 740 if the second drone 730 is to be docked on the first roadway vehicle 702, and the first drone 720 is capable of transporting the second package 735 to the second destination 742 if the first drone 720 is to be docked on the second roadway vehicle 704, the drone manager 206 may select the second drone 730 to perform the task exchange with the first drone 720. Accordingly, the drone manager 206 may reassign the first task to the second drone 830, and reassign the second task to the first drone 720.

In some embodiments, once the second drone 103 is selected, the drone manager 206 implemented in the first drone 103 and the second drone 103 may coordinate the task exchange between the first drone 103 and the second drone 103. Continuing the example in FIG. 7A, the first drone 720 may transfer the first package 725 from the first drone 720 to the first roadway vehicle 702, and the second drone 730 may transfer the second package 735 from the second drone 730 to the second roadway vehicle 704. For example, the first drone 720 may release the first package 725 onto the vehicle roof of the first roadway vehicle 702, and the second drone 730 may release the second package 735 onto the vehicle roof of the second roadway vehicle 704. The first drone 720 may then navigate from the first roadway vehicle 702 to the second roadway vehicle 704 that has the second package 735, and transfer the second package 735 from the second roadway vehicle 704 to the first drone 720. For example, the first drone 720 may leave the first package 725 on the vehicle roof of the first roadway vehicle 702, fly from the first roadway vehicle 702 to the second roadway vehicle 704, and pick up the second package 735 that was released by the second drone 730 from the vehicle roof of the second roadway vehicle 704. Similarly, the second drone 730 may navigate from the second roadway vehicle 704 to the first roadway vehicle 702 that has the first package 725, and transfer the first package 725 from the first roadway vehicle 702 to the second drone 730. For example, the second drone 730 may leave the second package 735 on the vehicle roof of the second roadway vehicle 704, fly from the second roadway vehicle 704 to the first roadway vehicle 702, and pick up the first package 725 that was released by the first drone 720 from the vehicle roof of the first roadway vehicle 702.

Thus, as a result of the first drone 720 transferring the first package 725 from the first drone 720 to the first roadway vehicle 702, and the second drone 730 transferring the first package 725 from the first roadway vehicle 702 to the second drone 730, the first package 725 is transferred from the first drone 720 to the second drone 730. As a result of the second drone 730 transferring the second package 735 from the second drone 730 to the second roadway vehicle 704, and the first drone 720 transferring the second package 735 from the second roadway vehicle 704 to the first drone 720, the second package 735 is transferred from the second drone 730 to the first drone 720. Alternatively, the first drone 720 may transfer the first package 725 directly to the second drone 730, and the second drone 730 may transfer the second package 735 directly to the first drone 720. Other implementations for coordinating the task exchange between the first drone 103 and the second drone 103 are also possible and contemplated.

As illustrated in FIG. 7A, once the task exchange between the first drone 720 and the second drone 730 is completed, the second drone 730 may carry the first package 725 and may dock on the first roadway vehicle 702 to be transported towards the first destination 740. As the first roadway vehicle 702 reaches the part-way location 711 at which the first roadway vehicle 702 starts to travel away from the first destination 740, the second drone 730 may carry the first package 725 and fly to the first destination 740, thereby transporting the first package 725 to the first destination 740 to complete the first task. Similarly, once the task exchange between the first drone 720 and the second drone 730 is completed, the first drone 720 may carry the second package 735 and may dock on the second roadway vehicle 704 to be transported towards the second destination 742. As the second roadway vehicle 704 reaches the part-way location 713 at which the second roadway vehicle 704 starts to travel away from the second destination 742, the first drone 720 may carry the second package 735 and fly to the second destination 742, thereby transporting the second package 735 to the second destination 742 to complete the second task. Thus, in this example, although the first drone 720 cannot reach the first destination 740 to complete the first task, by swapping the first drone 720 with the second drone 730, the first package 725 can be transported to the first destination 740 by the second drone 730 situated on the first roadway vehicle 702, and the second package 735 can be transported to the second destination 742 by the first drone 720 situated on the second roadway vehicle 704. Accordingly, both first task and second task can be successfully completed.

Figure 6B:
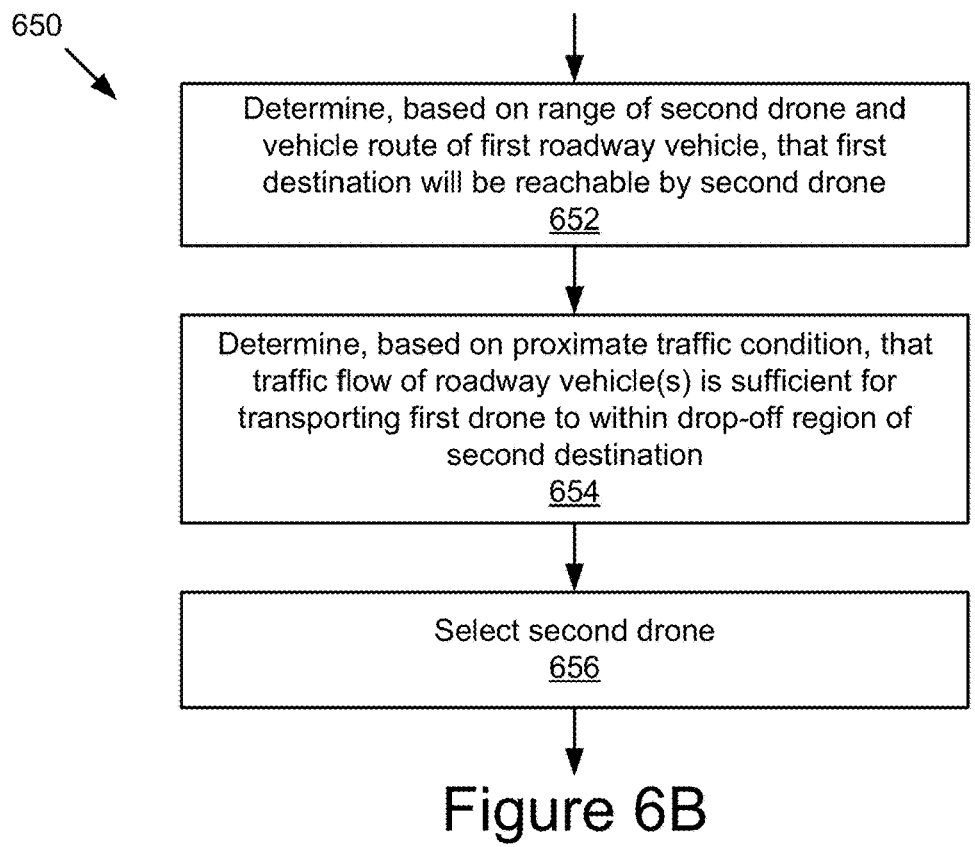

FIG. 6B is a flowchart of another example method 650 for selecting the second drone 103 to perform the task exchange between the first drone 103 and the second drone 103. In block 652, the drone manager 206 may determine that if the second drone 103 transports the first package, the first destination will be reachable by the second drone 103. The drone manager 206 may determine that the first destination will be reachable by the second drone 103 based on the range of the second drone 103 and the vehicle route of the first roadway vehicle 107 on which the first drone 103 is currently docked. In some embodiments, the drone manager 206 may determine on the vehicle route of the first roadway vehicle 107 a part-way location at which the first roadway vehicle 107 may start to travel away from the first destination. The drone manager 206 may determine that the distance between the part-way location and the first destination is lower than the flight distance that the second drone 103 can fly as indicated by the range of the second drone 103, and thus determine that the second drone 103 can reach the first destination.

In block 654, the drone manager 206 may determine that if the first drone 103 transports the second package, a traffic flow of one or more roadway vehicles 107 is sufficient for transporting the first drone 103 to within the drop-off region of the second destination. The drone manager 206 may determine that the traffic flow of the one or more roadway vehicles 107 is sufficient based on a proximate traffic condition. In some embodiments, the drop-off region of the second destination may be the region in which the drone 103 transporting the second package may fly to drop off the second package at the second destination within the drop-off region.

In some embodiments, the drone manager 206 may determine the vehicle route of the second roadway vehicle 107 on which the second drone 103 is currently docked, and determine on the vehicle route of the second roadway vehicle 107 the part-way location at which the second roadway vehicle 107 may travel away from the second destination. The drone manager 206 may analyze the traffic condition at one or more proximate locations on the vehicle route of the second roadway vehicle 107, the proximate locations may be located between the vehicle location of the second roadway vehicle 107 and the part-way location at which the second roadway vehicle 107 may travel away from the second destination. In some embodiments, the drone manager 206 may determine the traffic flow rate of the roadway vehicles 107 at the proximate location, and determine whether the traffic flow rate of the roadway vehicles 107 satisfies a traffic flow rate threshold. Alternatively, the drone manager 206 may determine the traffic flow rate of the roadway vehicles 107 that likely travel towards the second destination at the proximate location, or the traffic flow rate of the roadway vehicles 107 that likely travel to the start point of the drop-off region at the proximate location, and determine whether the traffic flow rate of these roadway vehicles 107 satisfies the traffic flow rate threshold. If the traffic flow rate of the roadway vehicles 107 satisfies the traffic flow rate threshold (e.g., more than 3200 vehicles/h), the drone manager 206 may determine that the traffic flow of the roadway vehicles 107 at the proximate location is sufficient to transport the first drone 103 carrying the second package to within the drop-off region of the second destination, or to transport another drone 103 that may receive the second package from the first drone 103 at the proximate location to within the drop-off region of the second destination. In block 656, the drone manager 206 may select the second drone 103 to perform the task exchange between the first drone 103 and the second drone 103.

Figure 7B:
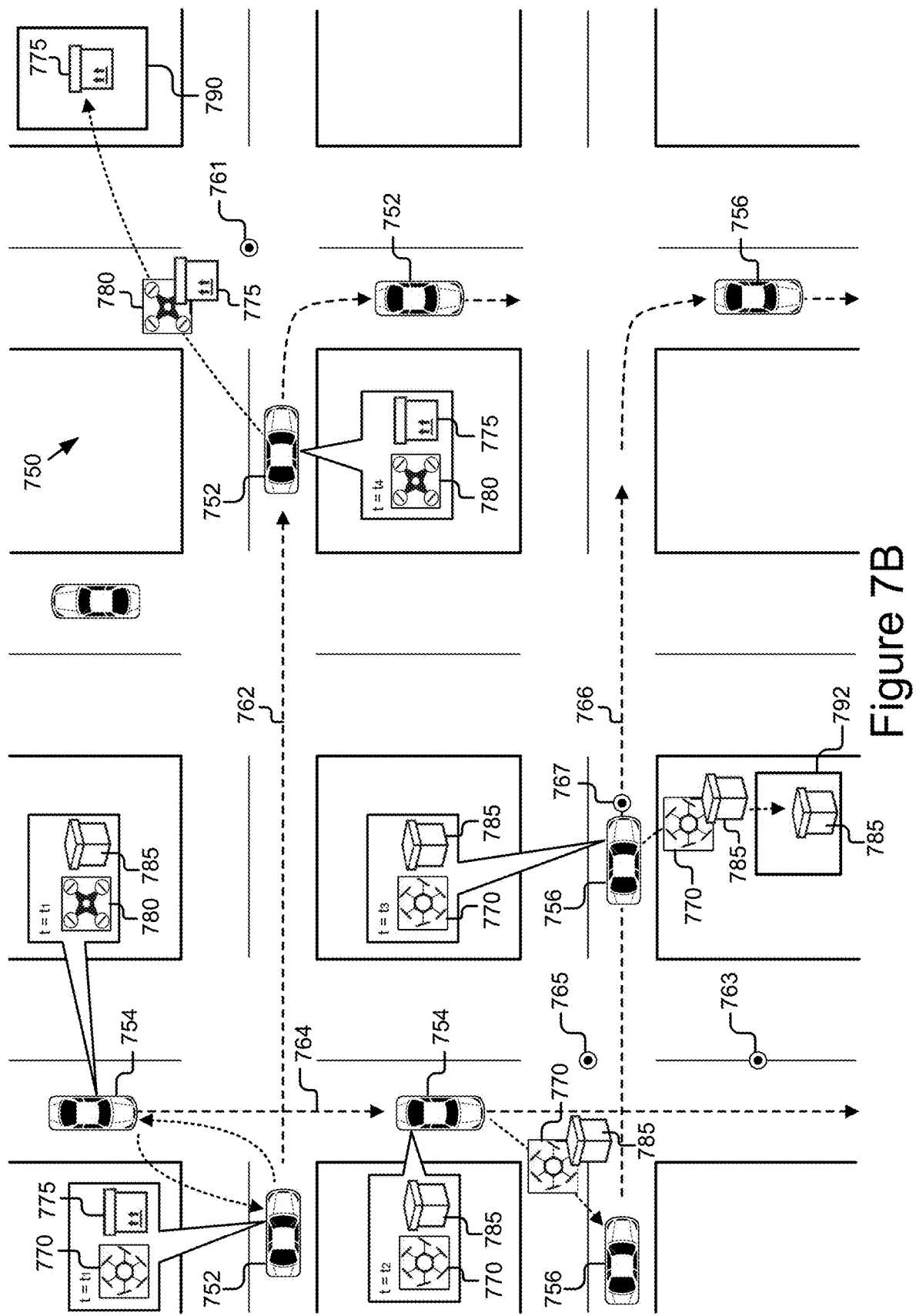

As an example, FIG. 7B illustrates an example scenario 750 in which the first drone 770 may be assigned a first task of transporting the first package 775 to the first destination 790, the first drone 770 may dock on a first roadway vehicle 752 that is traveling towards the first destination 790. In this example, the drone manager 206 may determine that the first drone 720 cannot reach the first destination 790, and thus determine that the first package 775 is to be transferred. The drone manager 206 may determine a second drone 780 in the drone network, the second drone 780 may be located within a predefined distance from the drone location of the first drone 770. The second drone 780 may be assigned a second task of transporting the second package 785 to the second destination 792, and the second drone 780 may dock on a second roadway vehicle 754 that is traveling towards the second destination 792.

The drone manager 206 may determine the vehicle route 762 of the first roadway vehicle 752, and determine on the vehicle route 762 the part-way location 761 at which the first roadway vehicle 752 may start traveling away from the first destination 790. The drone manager 206 may determine that the distance between the part-way location 761 and the first destination 790 (e.g., 400 m) is lower than the current range of the second drone 780 (e.g., 750 m), and thus determine that the second drone 780 is capable of transporting the first package 775 to the first destination 790 if the second drone 780 is to be docked on the first roadway vehicle 752.

The drone manager 206 may determine the vehicle route 764 of the second roadway vehicle 754, and determine on the vehicle route 764 the part-way location 763 at which the second roadway vehicle 754 may start traveling away from the second destination 792. The drone manager 206 may determine that the distance between the part-way location 763 and the second destination 792 (e.g., 150 m) is higher than the current range of the first drone 770 (e.g., 75 m), and thus determine that the first drone 770 is incapable of transporting the second package 785 to the second destination 792 if the first drone 770 is to be docked on second roadway vehicle 754. The drone manager 206 may then determine the traffic condition at one or more proximate locations between the vehicle location of the second roadway vehicle 754 and the part-way location 763. For example, the drone manager 206 may determine the traffic flow of the roadway vehicles 107 at the proximate location 765. In this example, the proximate location 765 may be the intersection located upstream of the part-way location 763 and directly adjacent to the part-way location 763. The drone manager 206 may determine that the traffic flow rate at the proximate location 765 satisfies the traffic flow rate threshold (e.g., more than 3200 vehicles/h), and thus determine that the traffic flow of the roadway vehicles 107 at the proximate location 765 is sufficient. Therefore, the drone manager 206 may determine that although the first drone 770 cannot reach the second destination 792 if the first drone 770 is to be docked on second roadway vehicle 754, the first drone 770 may likely be able to get on another roadway vehicle 107 that can transport the first drone 770 towards the second destination 792 at the proximate location 765, or to transfer the second package 785 to a third drone 103 that can reach the second destination 792 at the proximate location 765.

Thus, as discussed above, the drone manager 206 may determine that the second drone 780 is capable of transporting the first package 775 to the first destination 790 if the second drone 780 is to be docked on the first roadway vehicle 752, and while the first drone 770 cannot reach the second destination 792 if the first drone 770 is to be docked on the second roadway vehicle 754, the first drone 770 may likely be able to get on another roadway vehicle 107 or transfer the second package 785 to another drone 103 at the proximate location 765 so that the second package 785 can be transported to the second destination 792. As a result, the drone manager 206 may select the second drone 780 to perform the task exchange with the first drone 770. Accordingly, the drone manager 206 may reassign the first task to the second drone 780, and reassign the second task to the first drone 770.

Once the second drone 780 is selected, the first drone 770 and the second drone 780 may collaboratively perform the task exchange between the first drone 770 and the second drone 780 in a similar manner as discussed above with reference to FIG. 7A. Once the task exchange between the first drone 770 and the second drone 780 is completed, the second drone 780 may carry the first package 775 and may dock on the first roadway vehicle 752 to be transported towards the first destination 790. As the first roadway vehicle 752 reaches the part-way location 761 at which the first roadway vehicle 752 starts to travel away from the first destination 790, the second drone 780 may carry the first package 775 and fly to the first destination 790, thereby transporting the first package 775 to the first destination 790 to complete the first task. Similarly, once the task exchange between the first drone 770 and the second drone 780 is completed, the first drone 770 may carry the second package 785 and may dock on the second roadway vehicle 754 to be transported towards the second destination 792.

As the second roadway vehicle 754 reaches the proximate location 765 at which the traffic flow rate is relatively high, the first drone 770 may transfer the second package 785 to a third drone 103 that can reach the second destination 792 or can later on transfer the second package 785 to another drone 103 to transport the second package 785 towards the second destination 792. For example, the drone manager 206 implemented in the first drone 770 may determine the third drone 103 using the method 500 and/or the method 550 discussed above with reference to FIGS. 5A and 5B, and reassign the second task to the third drone 103. Alternatively, the first drone 770 may carry the second package 785 and get on a third roadway vehicle 107 that can transport the first drone 770 closer to the second destination 792. For example, the drone manager 206 implemented in the first drone 770 may determine the vehicle route 766 of the third roadway vehicle 756 that is located within a predefined distance from the drone location of the first drone 770, and determine that the third roadway vehicle 756 is traveling towards the second destination 792. The drone manager 206 may determine on the vehicle route 766 the part-way location 767 at which the third roadway vehicle 756 may travel away from the second destination 792. The drone manager 206 may determine that the distance between the part-way location 767 and the second destination 792 (e.g., 35 m) is lower than the current range of the first drone 770 (e.g., 75 m), and thus determine that the third roadway vehicle 107 can reach the second destination 792. The first drone 770 may then carry the second package 785, and navigate to dock on the third roadway vehicle 756, thereby being transported towards the second destination 792 by the third roadway vehicle 756. As the third roadway vehicle 756 reaches the part-way location 767 at which the third roadway vehicle 756 starts to travel away from the second destination 792, the first drone 770 may carry the second package 785 and fly to the second destination 792, thereby transporting the second package 785 to the second destination 792 to complete the second task.

Thus, in this example, although the first drone 770 cannot reach the first destination 790 to complete the first task, by switching the first drone 770 with the second drone 780, the first package 775 can be transported to the first destination 790 by the second drone 730 situated on the first roadway vehicle 752, and the second package 785 can be transported to the second destination 792 by the first drone 770 situated on the second roadway vehicle 754 and then situated on the third roadway vehicle 756. Accordingly, both the first task and the second task can be successfully completed.

As discussed elsewhere herein, the present technology may be implemented in the drones 103 so that the drones 103 can dynamically transfer the packages associated with their drone tasks to other drones 103 when needed, and thus the likelihood of the drone tasks being successfully completed can be significantly improved. In some embodiments, the first drone 103 may receive a first task instructing the first drone 103 to transport a first package to a first destination in a geographic area. The first drone 103 may receive roadway traffic data for the geographic area and/or drone data associated with one or more drones 103. As discussed elsewhere herein, the roadway traffic data of the geographic area may include roadway data associated with one or more road segments (e.g., traffic condition, roadway status, etc.), vehicle data associated with one or more roadway vehicles 107 (e.g., vehicle route, vehicle behavior data, etc.), etc. The drone data may include the current range of the drone 103, the package data of the package associated with current drone task of the drone 103, the roadway vehicle 107 on which the drone 103 is currently docked, etc.

In some embodiments, during the transit of the first package to the first destination by the first drone 103, the first drone 103 may establish a drone network with other drones 103 located within a predefined distance from its drone location, and determine to transfer the first package to a second drone 103 of the drone network. For example, the first drone 103 may perform the method 400 discussed above with reference to FIG. 4 to determine whether the first package is to be transferred, and if the first package is to be transferred, the first drone 103 may perform one or more of the methods 500, 550, 600, 650 discussed above with reference to FIGS. 5A, 5B, 6A, 6B to determine the second drone 103 to which the first package will be transferred. As discussed elsewhere herein, the first drone 103 may select the second drone 103 from the drone network based on one or more of the range of the first drone 103, the range of the second drone 103, the traffic condition associated with the vehicle route of the first roadway vehicle 107 on which the first drone 103 is currently docked, the traffic condition associated with the vehicle route of the second roadway vehicle 107 on which the second drone 103 is currently docked, etc. In some embodiments, once the second drone 103 is selected, the first drone 103 may wirelessly communicate a transfer request to the second drone 103, the transfer request may request to transfer the first package to the second drone 103. In some embodiments, the first drone 103 may wirelessly receive from the second drone 103 a response to the transfer request, the response to the transfer request may accept the transfer of the first package. The first drone 103 may then transfer the first package to the second drone 103.

As discussed elsewhere herein, in some embodiments, to transfer the first package from the first drone 103 to the second drone 103, the first drone 103 may reassign the first task to the second drone 103, the reassigned first task may instruct the second drone 103 to transport the first package to the first destination. In some embodiments, the second drone 103 may currently dock on a second roadway vehicle 107 that is traveling towards the first destination in the geographic area. As the first task of transporting the first package is reassigned to the second drone 103, the first drone 103 may carry the first package and navigate to the second roadway vehicle 107, and the first drone 103 and the second drone 103 may then collaboratively perform the package handover of the first package from the first drone 103 to the second drone 103. As a result of the package handover, the second drone 103 may carry the first package and handle the first task of transporting the first package to the first destination. In some embodiments, the drone manager 206 implemented in the first drone 103 and/or the second drone 103 may update the drone task list of the first drone 103 and the drone task list of the second drone 103 in the server data store 123 of the management server 101 to reflect the reassignment of the first task from the first drone 103 to the second drone 103.

As discussed elsewhere herein, the second drone 103 may itself be assigned a second task, the second task may instruct the second drone 103 to transport a second package to a second destination in the geographic area. The second destination associated with the first task may be distinct from the first destination associated with the first task. As discussed elsewhere herein, in some embodiments, to transfer the first package from the first drone 103 to the second drone 103, the first drone 103 and the second drone 103 may perform a task exchange in which the first drone 103 may reassign the first task to the second drone 103, and reassign the second task to the first drone 103. In some embodiments, the first drone 103 may currently dock on a first roadway vehicle 107 that is traveling towards the first destination, and the second drone 103 may currently dock on a second roadway vehicle 107 that is traveling towards the second destination in the geographic area. As the first task of transporting the first package is reassigned to the second drone 103 and the second task of transporting the second package is reassigned to the first drone 103, the first drone 103 may transfer the first package to the first roadway vehicle 107, navigate from the first roadway vehicle 107 to the second roadway vehicle 107 having the second package that was previously transferred from the second drone 103 to the second roadway vehicle 107 by the second drone 103, and transfer the second package from the second roadway vehicle 107 to the first drone 103. Similarly, the second drone 103 may transfer the second package to the second roadway vehicle 107, navigate from the second roadway vehicle 107 to the first roadway vehicle 107 having the first package that was previously transferred from the first drone 103 to the first roadway vehicle 107 by the first drone 103, and transfer the first package from the first roadway vehicle 107 to the second drone 103.

Thus, as a result of the task exchange between the first drone 103 and the second drone 103, the second drone 103 may carry the first package and handle the first task of transporting the first package to the first destination, and the first drone 103 may carry the second package and handle the second task of transporting the second package to the second destination. In some embodiments, the drone manager 206 implemented in the first drone 103 and/or the second drone 103 may update the drone task list of the first drone 103 and the drone task list of the second drone 103 in the server data store 123 of the management server 101 to reflect the reassignment of the first task from the first drone 103 to the second drone 103 and the reassignment of the second task from the second drone 103 to the first drone 103.

In some embodiments, the drone 103 and the roadway vehicle 107 may collaborate to facilitate the drone operations of the drone 103 that are related to the roadway vehicle 107. In some embodiments, as the drone 103 land on, take off, release package, receive package, etc., to and from the roadway vehicle 107, the drone 103 may communicate a drone facilitation instruction to the roadway vehicle 107, the drone facilitation instruction may instruct the roadway vehicle 107 to adjust its vehicle movement to facilitate the drone operations of the drone 103. For example, the drone 103 may instruct the roadway vehicle 107 to adjust its vehicle speed to satisfy a vehicle speed threshold (e.g., less than 35 mph), stay in current lane for at least a predefined time period (e.g., 20 s), etc., thereby facilitating the process of docking, undocking, package handover, task exchange, etc., performed by the drone 103.

In the above description, for purposes of explanation, numerous specific details are set forth in order to provide a thorough understanding of the present disclosure. However, it should be understood that the technology described herein could be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, application layer protocols, and/or other communication protocols discussed elsewhere herein.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions and/or formats.

Furthermore, the modules, routines, features, attributes, methodologies, and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A method comprising:
    assigning a first drone of a drone network a first task, the first task instructing the first drone to transport a first package to a first destination in a geographic area;
    receiving roadway traffic data for a plurality of roadway vehicles in the geographic area;
    determining, based on the roadway traffic data for the plurality of roadway vehicles, a vehicle route of a first roadway vehicle of the plurality of roadway vehicles, and during transit of the first package to the first destination by the first drone, to transfer the first package to a second drone in the drone network, the first drone being docked on the first roadway vehicle that is traveling towards the first destination on at least part of the vehicle route of the first roadway vehicle;
    determining to transfer the first package to the second drone based on a range of the first drone and the vehicle route of the first roadway vehicle; and
    transferring the first package to the second drone in the drone network.

2. The method of claim 1, further comprising:
    assigning the second drone of the drone network a second task, the second task instructing the second drone to transport a second package to a second destination in the geographic area;
    reassigning the first task to the second drone and the second task to the first drone;
    transferring the first package from the first drone to the first roadway vehicle;
    transferring the second package from the second drone to a second roadway vehicle;
    navigating the first drone from the first roadway vehicle to the second roadway vehicle having the second package; and
    navigating the second drone from the second roadway vehicle to the first roadway vehicle having the first package, wherein transferring the first package to the second drone includes:
        transferring the first package from the first drone to the first roadway vehicle; and transferring the first package from the first roadway vehicle to the second drone.

3. The method of claim 2, wherein reassigning the first task to the second drone and the second task to the first drone is based on one or more of:
- a task priority;
- a battery level of the first drone;
- a battery level of the second drone;
- a traffic condition associated with the vehicle route of the first roadway vehicle; and
- a traffic condition associated with a vehicle route of the second roadway vehicle.

4. The method of claim 1, wherein:
the second drone is docked on a second roadway vehicle that is traveling towards the first destination in the geographic area;
determining to transfer the first package to the second drone includes:
  determining a vehicle route of the second roadway vehicle based on the roadway traffic data; and
  selecting, from the drone network, the second drone based on the vehicle route of the second roadway vehicle; and
transferring the first package to the second drone includes:
  reassigning the first task to the second drone, the reassigned first task instructing the second drone to transport the first package to the first destination in the geographic area; and
  coordinating a package handover of the first package from the first drone to the second drone.

5. The method of claim 4, wherein selecting the second drone includes:
determining, based on an assigned task of the second drone, an available range of the second drone;
determining, based on the available range of the second drone and the vehicle route of the second roadway vehicle, that the first destination will be reachable by the second drone; and
selecting the second drone from the drone network based on the first destination being reachable by the second drone.

6. The method of claim 4, wherein selecting the second drone includes:
determining, based on a proximate traffic condition, that a traffic flow of one or more roadway vehicles is sufficient for transporting the second drone to within a drop-off region of the first destination; and
selecting the second drone from the drone network based on the traffic flow being sufficient.

7. The method of claim 1, wherein determining to transfer the first package to the second drone includes:
determining, based on the range of the first drone and the vehicle route of the first roadway vehicle, that the first destination is unreachable by the first drone;
determining, based on a proximate traffic condition, that a traffic flow of one or more roadway vehicles is insufficient for transporting the first drone to within a drop-off region of the first destination; and
determining to transfer the first package to the second drone based on the first destination being unreachable and the traffic flow being insufficient.

8. A system comprising:
one or more processors; and
one or more memories storing instructions that, when executed by the one or more processors, cause the system to:
  assign a first drone of a drone network a first task, the first task instructing the first drone to transport a first package to a first destination in a geographic area;
  receive roadway traffic data for a plurality of roadway vehicles in the geographic area;
  determine, based on the roadway traffic data for the plurality of roadway vehicles, a vehicle route of a first roadway vehicle of the plurality of roadway vehicles, and during transit of the first package to the first destination by the first drone, to transfer the first package to a second drone in the drone network, the first drone being docked on the first roadway vehicle that is traveling towards the first destination on at least part of the vehicle route of the first roadway vehicle;
  determine to transfer the first package to the second drone based on a range of the first drone and the vehicle route of the first roadway vehicle; and
  transfer the first package to the second drone in the drone network.

9. The system of claim 8, wherein the instructions, when executed by the one or more processors, further cause the system to:
assign the second drone of the drone network a second task, the second task instructing the second drone to transport a second package to a second destination in the geographic area;
reassign the first task to the second drone and the second task to the first drone;
transfer the first package from the first drone to the first roadway vehicle;
transfer the second package from the second drone to a second roadway vehicle;
navigate the first drone from the first roadway vehicle to the second roadway vehicle having the second package; and
navigate the second drone from the second roadway vehicle to the first roadway vehicle having the first package, wherein transferring the first package to the second drone includes:
  transferring the first package from the first drone to the first roadway vehicle; and
  transferring the first package from the first roadway vehicle to the second drone.

10. The system of claim 9, wherein reassigning the first task to the second drone and the second task to the first drone is based on one or more of:
- a task priority;
- a battery level of the first drone;
- a battery level of the second drone;
- a traffic condition associated with the vehicle route of the first roadway vehicle; and
- a traffic condition associated with a vehicle route of the second roadway vehicle.

11. The system of claim 8, wherein determining to transfer the first package to the second drone includes:
determining, based on the range of the first drone and the vehicle route of the first roadway vehicle, that the first destination is unreachable by the first drone;
determining, based on a proximate traffic condition, that a traffic flow of one or more roadway vehicles is insufficient for transporting the first drone to within a drop-off region of the first destination; and
determining to transfer the first package to the second drone based on the first destination being unreachable and the traffic flow being insufficient.

12. The system of claim 8, wherein:
the second drone is docked on a second roadway vehicle that is traveling towards the first destination in the geographic area;
determining to transfer the first package to the second drone includes:
- determining a vehicle route of the second roadway vehicle based on the roadway traffic data; and
- selecting, from the drone network, the second drone based on the vehicle route of the second roadway vehicle; and transferring the first package to the second drone includes:
- reassigning the first task to the second drone, the reassigned first task instructing the second drone to transport the first package to the first destination in the geographic area; and
- coordinating a package handover of the first package from the first drone to the second drone.

13. The system of claim 12, wherein selecting the second drone includes:
- determining, based on an assigned task of the second drone, an available range of the second drone;
- determining, based on the available range of the second drone and the vehicle route of the second roadway vehicle, that the first destination will be reachable by the second drone; and
- selecting the second drone from the drone network based on the first destination being reachable by the second drone.

14. The system of claim 12, wherein selecting the second drone includes:
- determining, based on a proximate traffic condition, that a traffic flow of one or more roadway vehicles is sufficient for transporting the second drone to within a drop-off region of the first destination; and
- selecting the second drone from the drone network based on the traffic flow being sufficient.

15. A method comprising:
receiving, at a first drone of a drone network, a first task to transport a first package to a first destination in a geographic area;
receiving roadway traffic data for the geographic area;
determining, based on the roadway traffic data for the geographic area, a vehicle route of a first roadway vehicle, and during transit of the first package to the first destination by the first drone, to transfer the first package to a second drone of the drone network, the first drone being docked on the first roadway vehicle that is traveling towards the first destination on at least part of the vehicle route of the first roadway vehicle;

determining to transfer the first package to the second drone based on a range of the first drone and the vehicle route of the first roadway vehicle;
wirelessly communicating a request to transfer the first package to the second drone;
wirelessly receiving a response to the request accepting the transfer of the first package; and
transferring the first package to the second drone.

16. The method of claim 15, wherein:
the second drone is assigned a second task, the second task instructing the second drone to transport a second package to a second destination in the geographic area;
wirelessly communicating the request to transfer the first package to the second drone includes reassigning the first task to the second drone and the second task to the first drone; and
transferring the first package to the second drone includes:
- transferring the first package from the first drone to a first roadway vehicle;
- navigating from the first roadway vehicle to a second roadway vehicle having the second package, the second package being transferred from the second drone to the second roadway vehicle; and
- transferring the second package from the second roadway vehicle to the first drone.

17. The method of claim 15, further comprising:
selecting the second drone network based on one or more of:
- a task priority;
- a range of the first drone;
- a range of the second drone;
- a traffic condition associated with the vehicle route of the first roadway vehicle, the first drone being docked on the first roadway vehicle; and
- a traffic condition associated with a vehicle route of a second roadway vehicle, the second drone being docked on the second roadway vehicle.

18. The method of claim 15, wherein:
the second drone is docked on a second roadway vehicle that is traveling towards the first destination in the geographic area;
wirelessly communicating the request to transfer the first package to the second drone includes reassigning the first task to the second drone, the reassigned first task instructing the second drone to transport the first package to the first destination in the geographic area; and
transferring the first package to the second drone includes:
- navigating to the second roadway vehicle; and
- performing a package handover of the first package from the first drone to the second drone.

* * * * *